A. R. SCHOLIN.
PROCESS OF PLACING WRAPPERS ON PACKAGES AND MECHANISM FOR CARRYING OUT SAID PROCESS.
APPLICATION FILED OCT. 7, 1918.

1,417,946.

Patented May 30, 1922.

Inventor
Axel R. Scholin
By Brown + Nissen Atty's

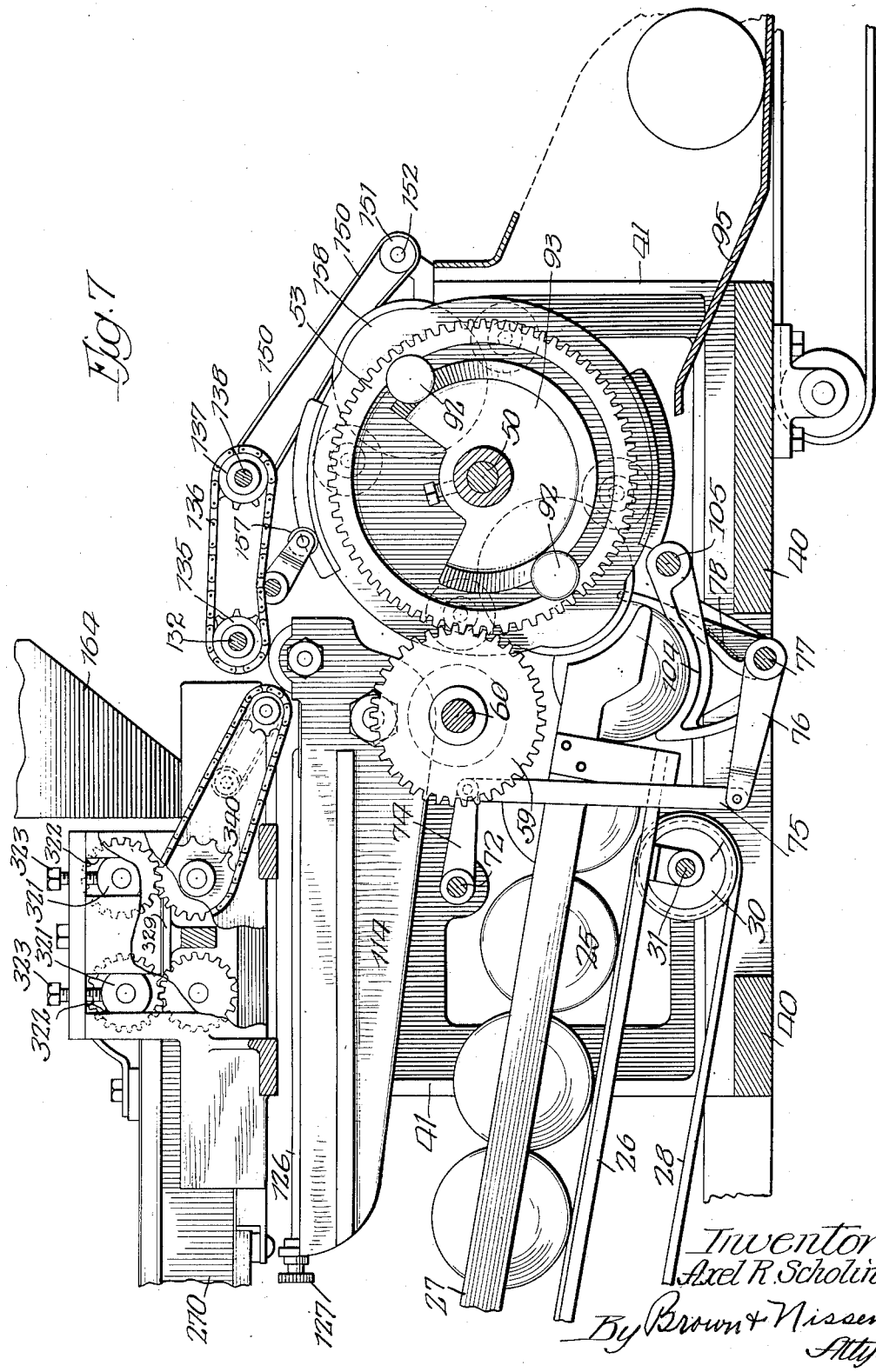

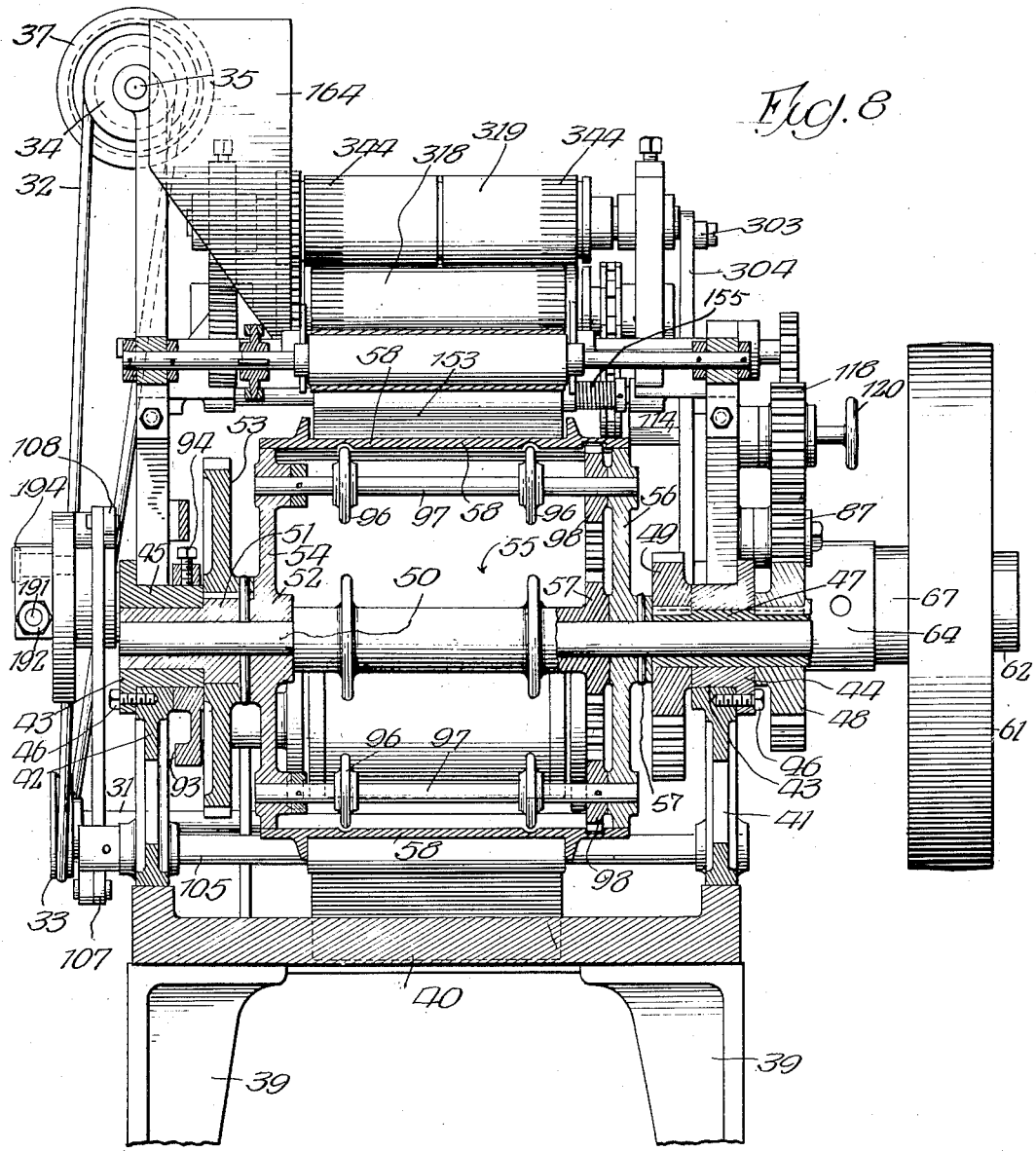

A. R. SCHOLIN.
PROCESS OF PLACING WRAPPERS ON PACKAGES AND MECHANISM FOR CARRYING OUT SAID PROCESS.
APPLICATION FILED OCT. 7, 1918.
1,417,946.
Patented May 30, 1922.
16 SHEETS—SHEET 9.
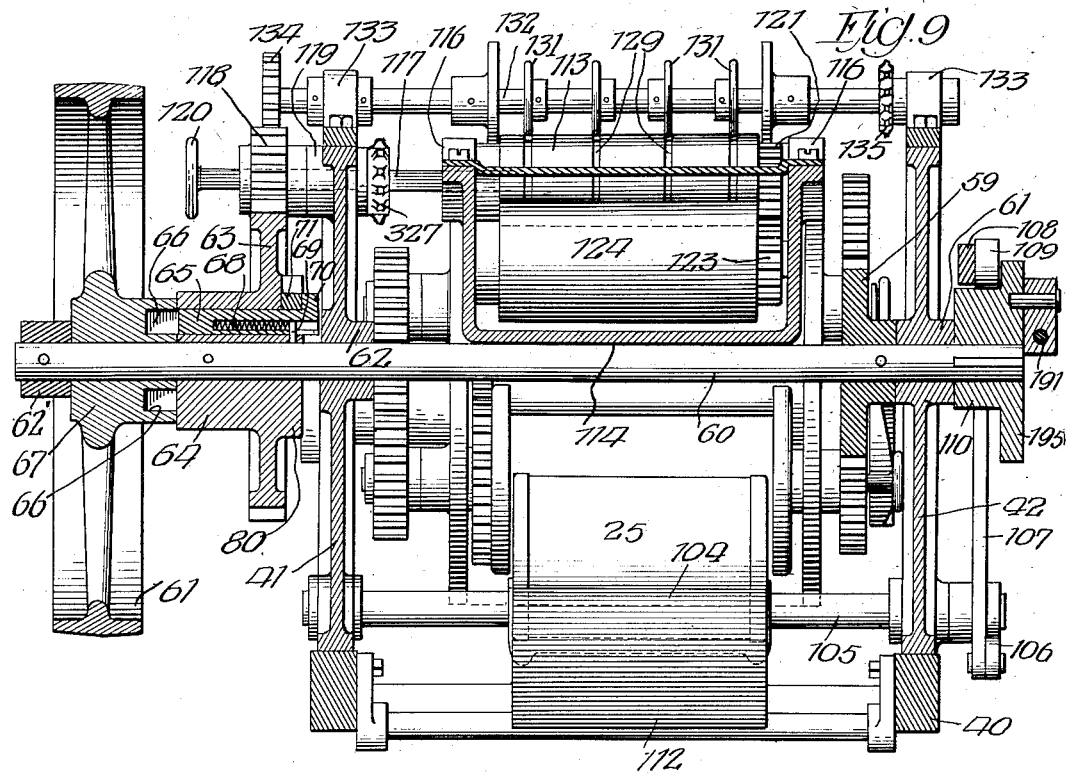
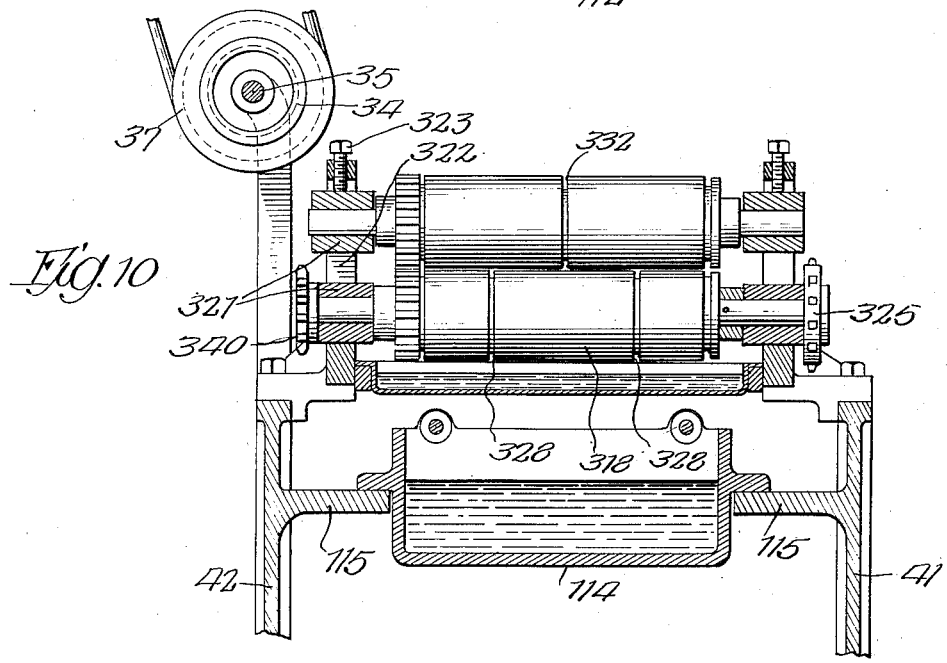
Inventor
Axel R. Scholin
By Brown & Nissen Attys.

A. R. SCHOLIN.
PROCESS OF PLACING WRAPPERS ON PACKAGES AND MECHANISM FOR CARRYING OUT SAID PROCESS.
APPLICATION FILED OCT. 7, 1918.
1,417,946.
Patented May 30, 1922.
16 SHEETS—SHEET 10.
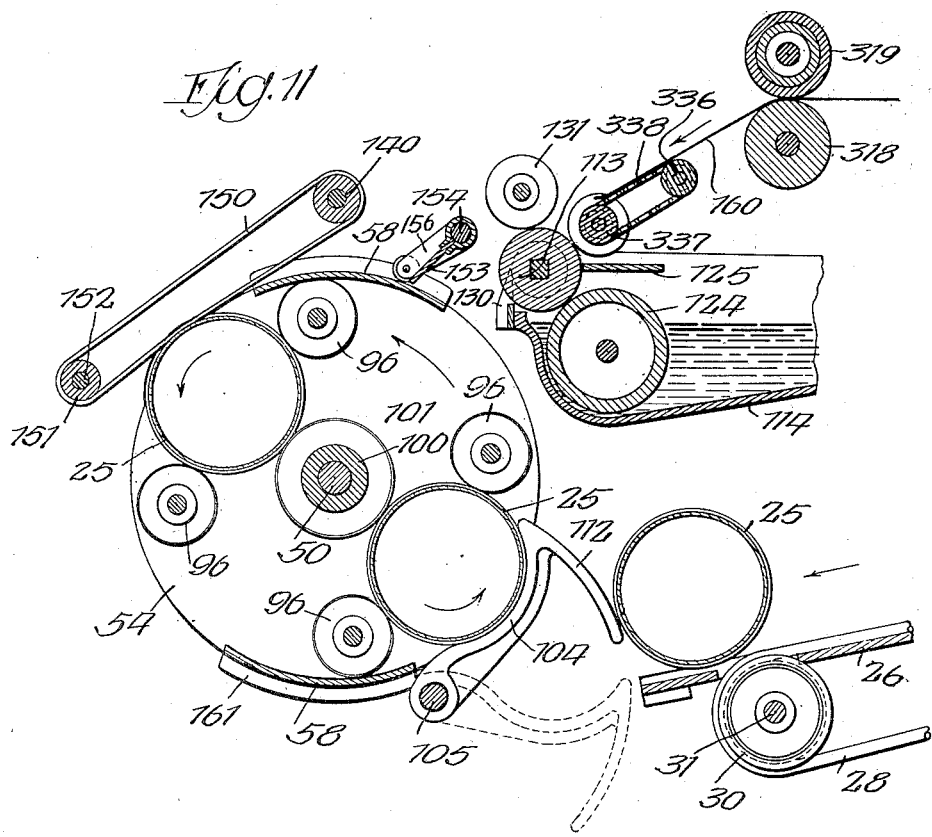
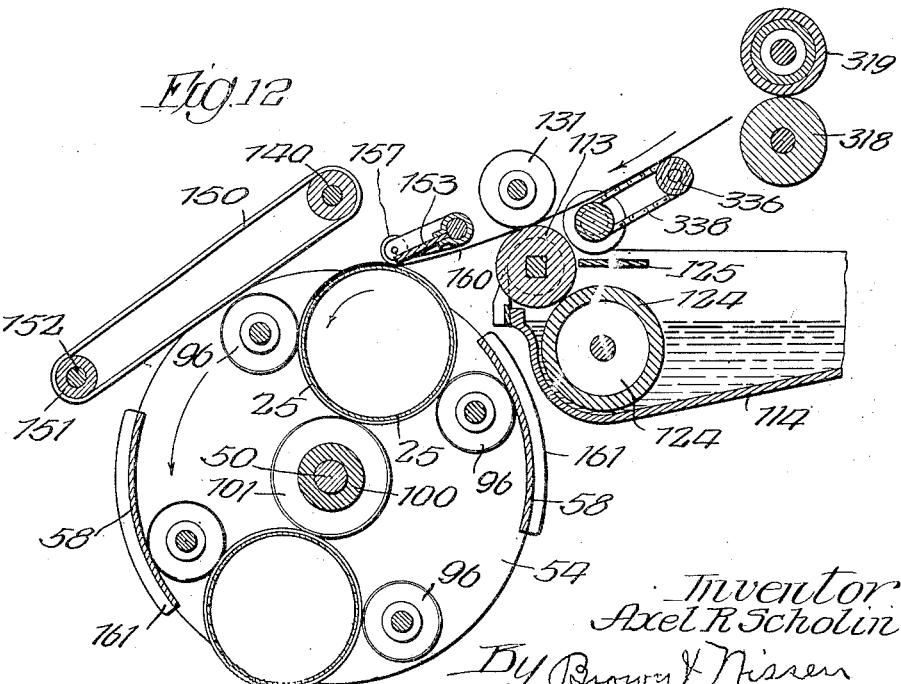
Inventor
Axel R Scholin
By Brown & Nissen
Attys A. R. SCHOLIN.
PROCESS OF PLACING WRAPPERS ON PACKAGES AND MECHANISM FOR CARRYING OUT SAID PROCESS.
APPLICATION FILED OCT. 7, 1918.

1,417,946.

Patented May 30, 1922.
16 SHEETS—SHEET 11.

Inventor
Axel R. Scholin
By Brown & Nissen Atty's

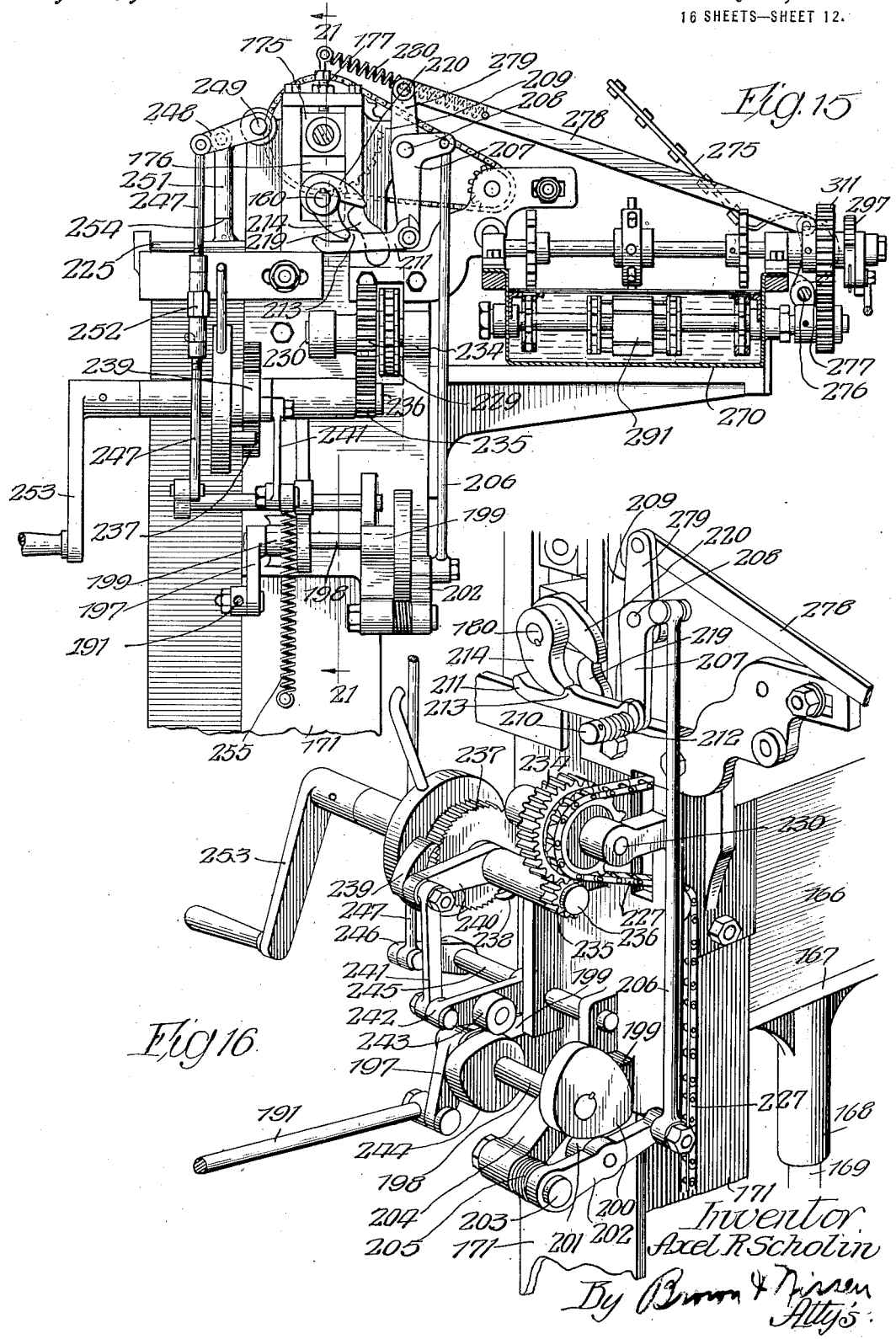

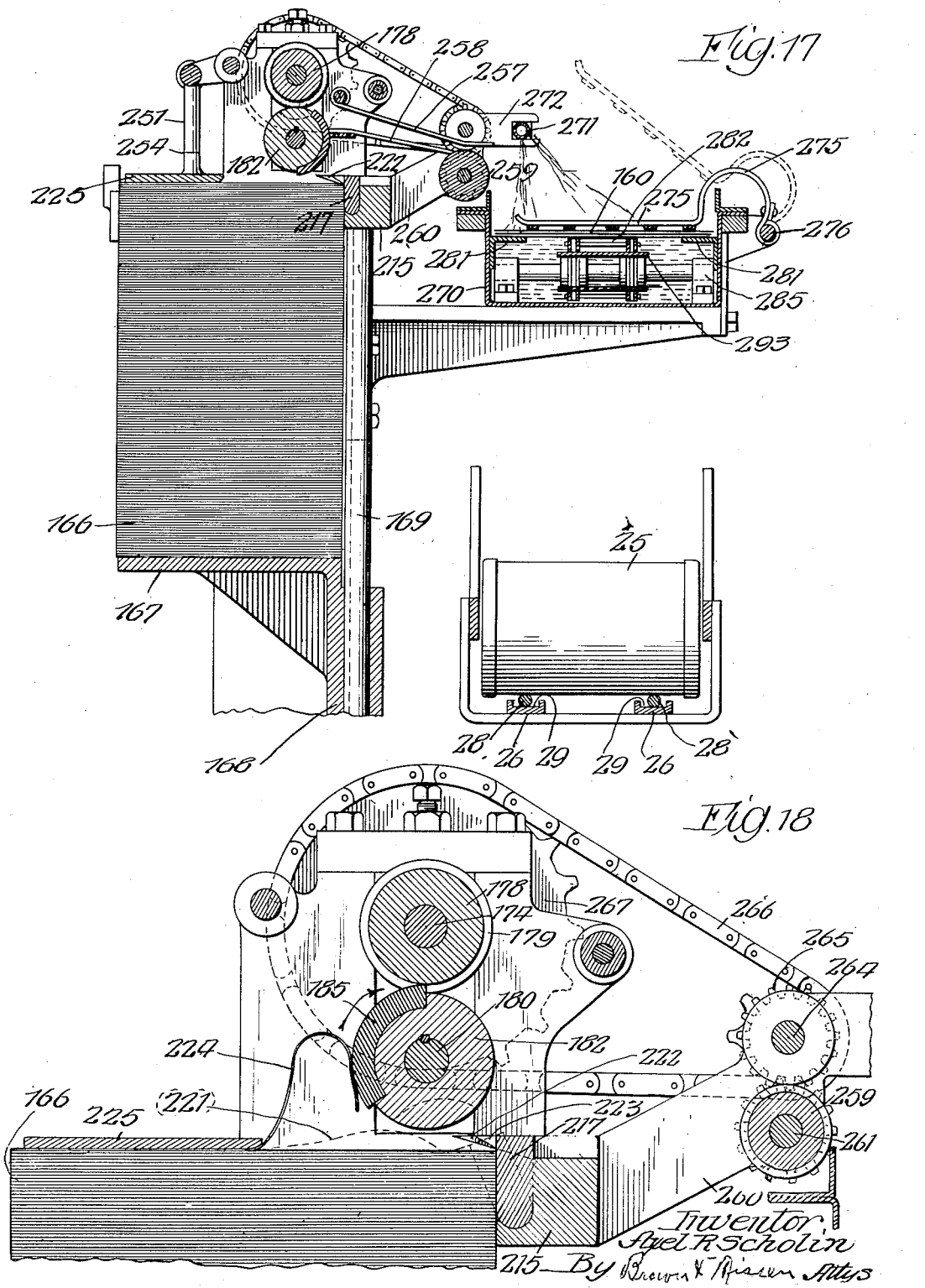

A. R. SCHOLIN.
PROCESS OF PLACING WRAPPERS ON PACKAGES AND MECHANISM FOR CARRYING OUT SAID PROCESS.
APPLICATION FILED OCT. 7, 1918.
1,417,946.  Patented May 30, 1922.
16 SHEETS—SHEET 14.
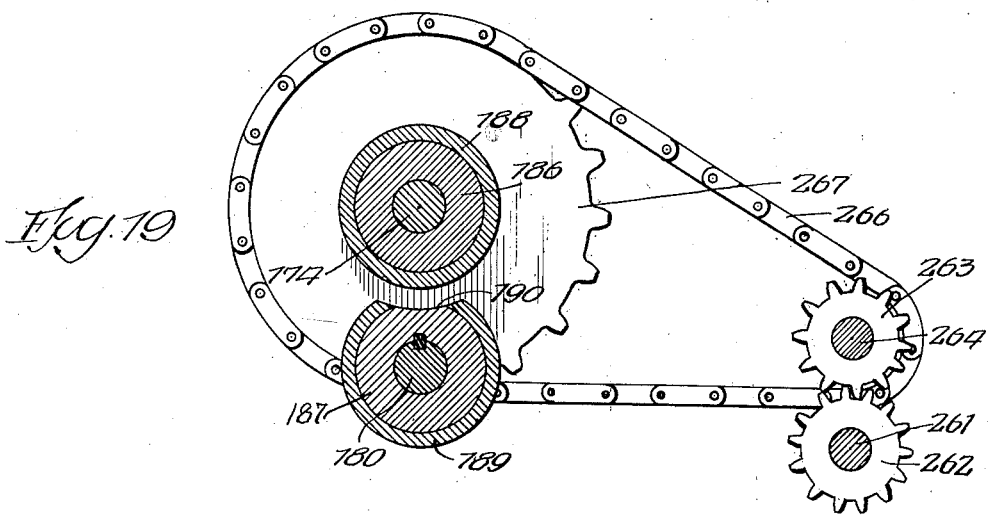
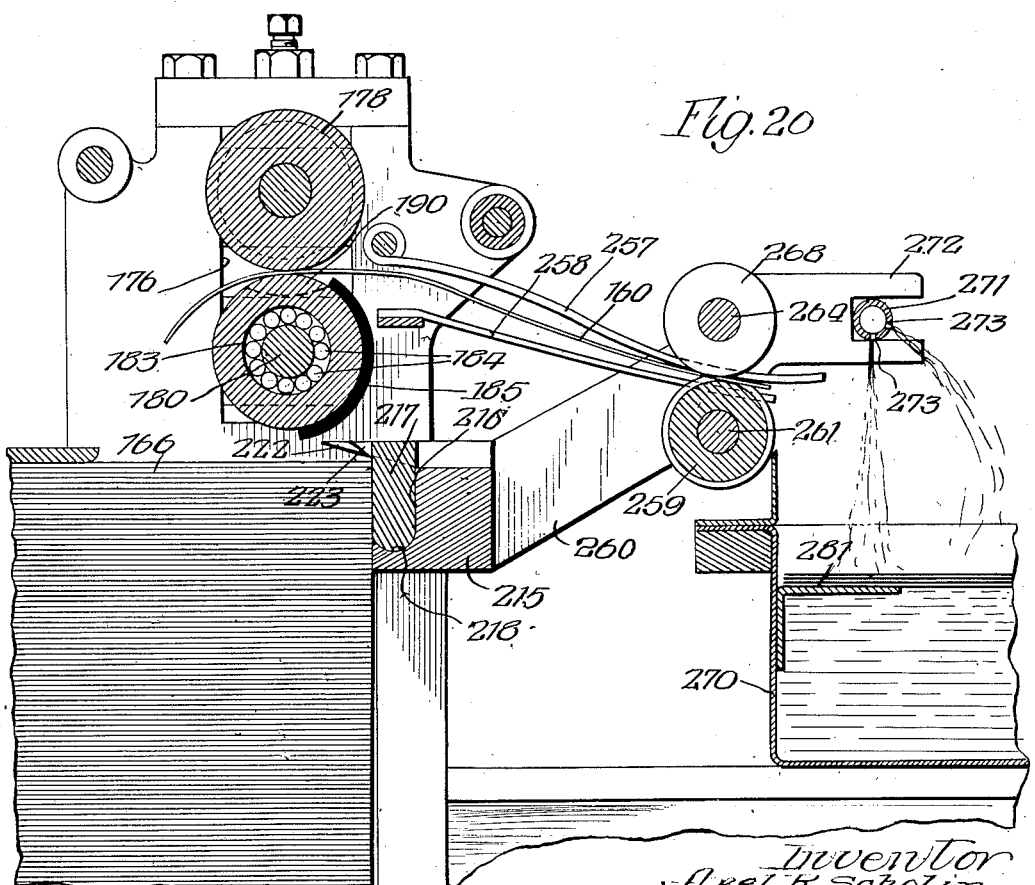

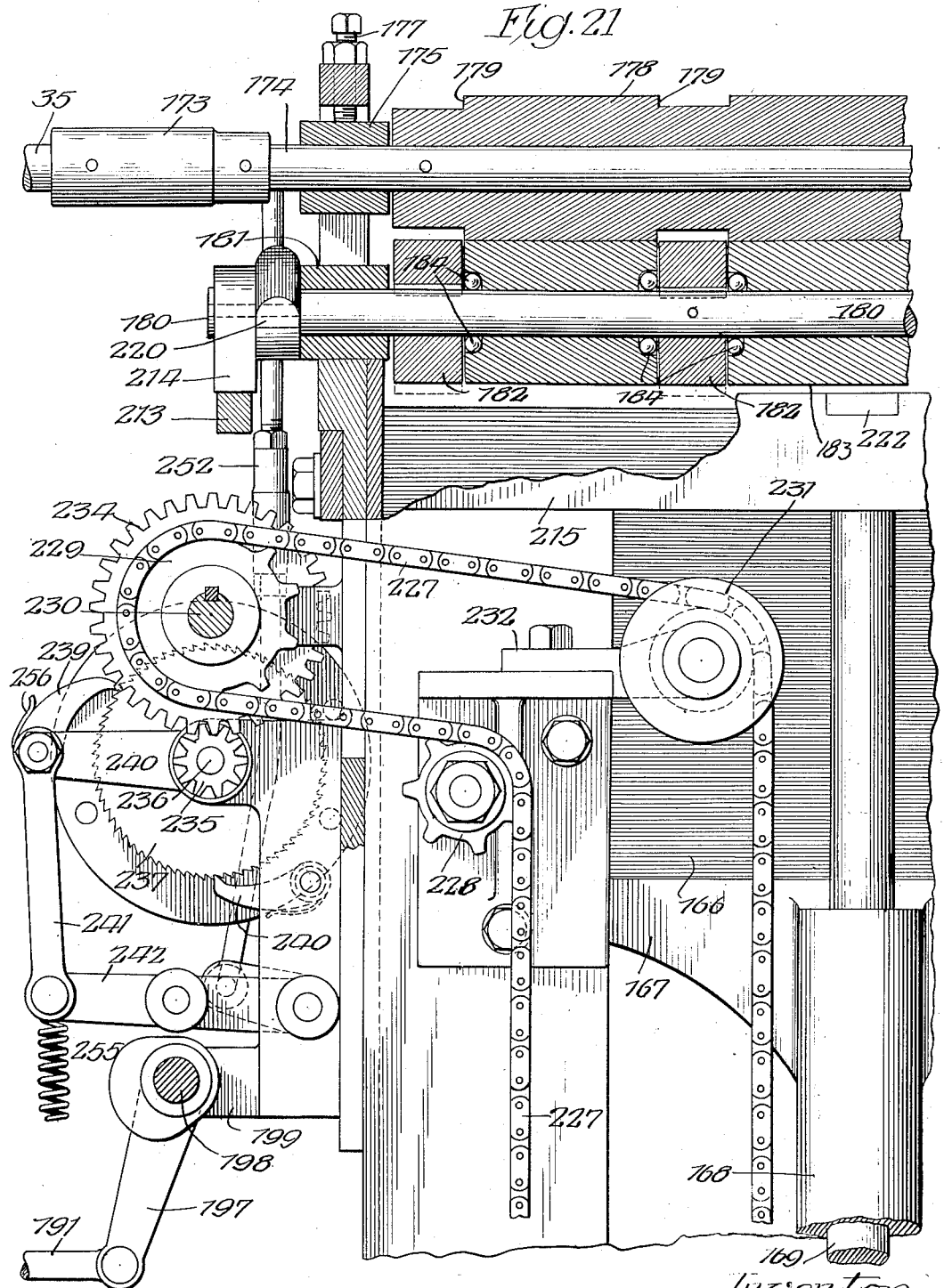

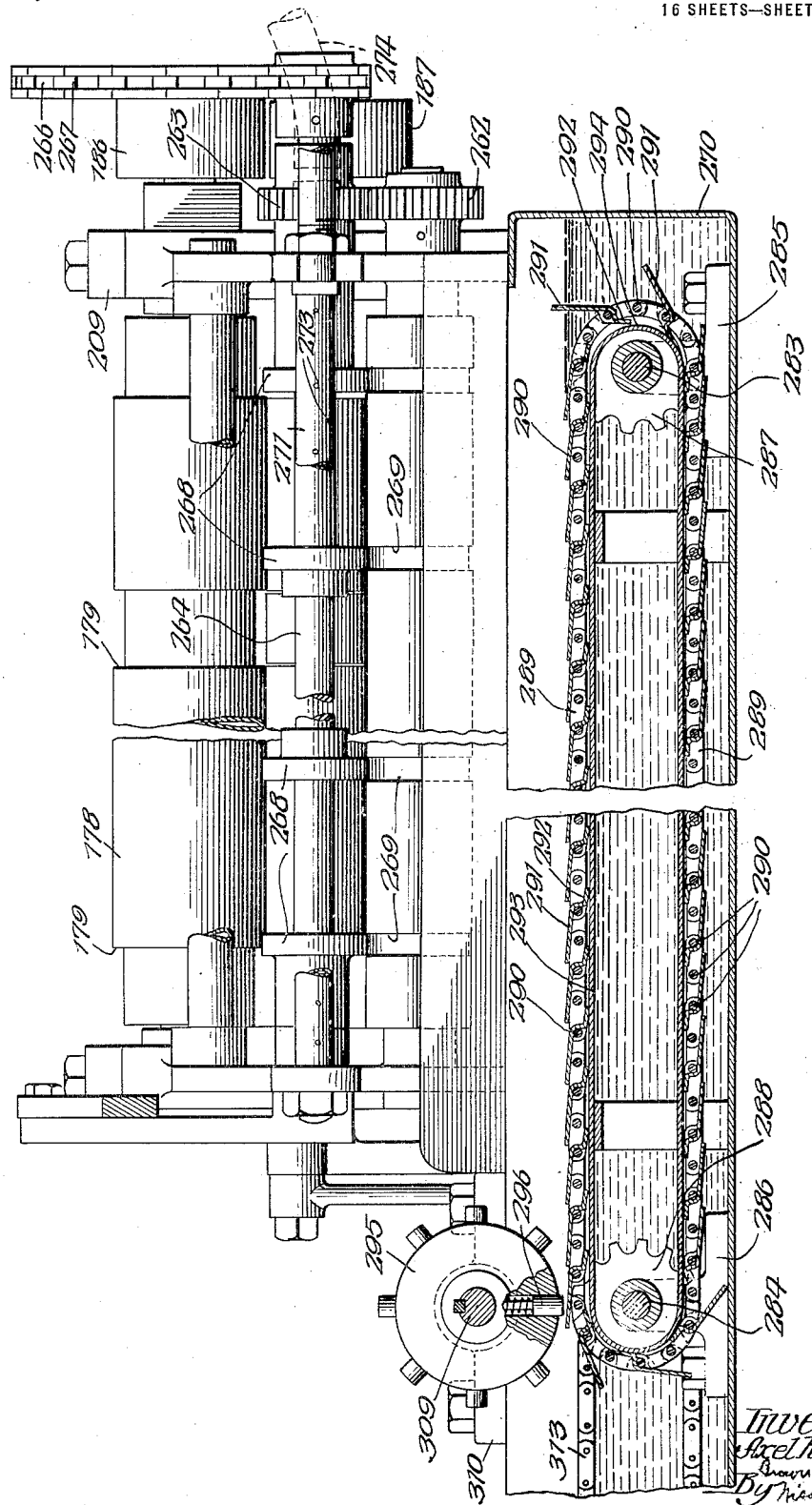

UNITED STATES PATENT OFFICE.

AXEL R. SCHOLIN, OF CHICAGO, ILLINOIS, ASSIGNOR TO AUTOMATIC WRAPPING MACHINE CO., OF CHICAGO, ILLINOIS, A CORPORATION OF ILLINOIS.

PROCESS OF PLACING WRAPPERS ON PACKAGES AND MECHANISM FOR CARRYING OUT SAID PROCESS.

1,417,946.     Specification of Letters Patent.   Patented May 30, 1922.

Application filed October 7, 1918. Serial No. 257,222.

*To all whom it may concern:*

Be it known that I, AXEL R. SCHOLIN, a citizen of the United States, residing at Chicago, in the county of Cook and State of Illinois, have invented certain new and useful Processes of Placing Wrappers on Packages and Mechanism for Carrying Out Said Processes, of which the following is a specification.

The object of the invention is to provide an efficient process of placing wrappers on packages and a machine for carrying out such process which shall be of improved construction and operation.

The invention is exemplified in the combination and arrangement of parts shown in the accompanying drawings and described in the following specification, and also in the steps of the process described in the specification and illustrated in the drawings. The invention is more particularly pointed out in the appended claims.

In the drawings—

Fig. 7 is a vertical section substantially on line 7—7 of Fig. 3.

Fig. 8 is a transverse vertical section on line 8—8 of Fig. 1.

Fig. 9 is a transverse vertical section on line 9—9 of Fig. 1.

Fig. 10 is a vertical section on line 10—10 of Fig. 6.

Figs. 11 and 12 are diagrammatic vertical sectional views through the wrapping cylinder and associated parts showing two stages in the process of wrapping a container.

Fig. 15 is a fragmentary sectional view on line 15—15 of Fig. 4.

Fig. 16 is a fragmentary perspective view showing a portion of the operating mechanism for the paper feed.

Fig. 17 is a sectional view on line 17—17 of Fig. 4.

Fig. 18 is a sectional view on line 18—18 of Fig. 4.

Fig. 19 is a detail in section of a portion of the paper feeding mechanism.

Fig. 20 is a section on line 20—20 of Fig. 4.

Fig. 21 is a fragmentary elevation with parts in section on line 21—21 of Fig. 15; and Fig. 22 is a section on line 22—22 of Fig. 4.

Figure 1:
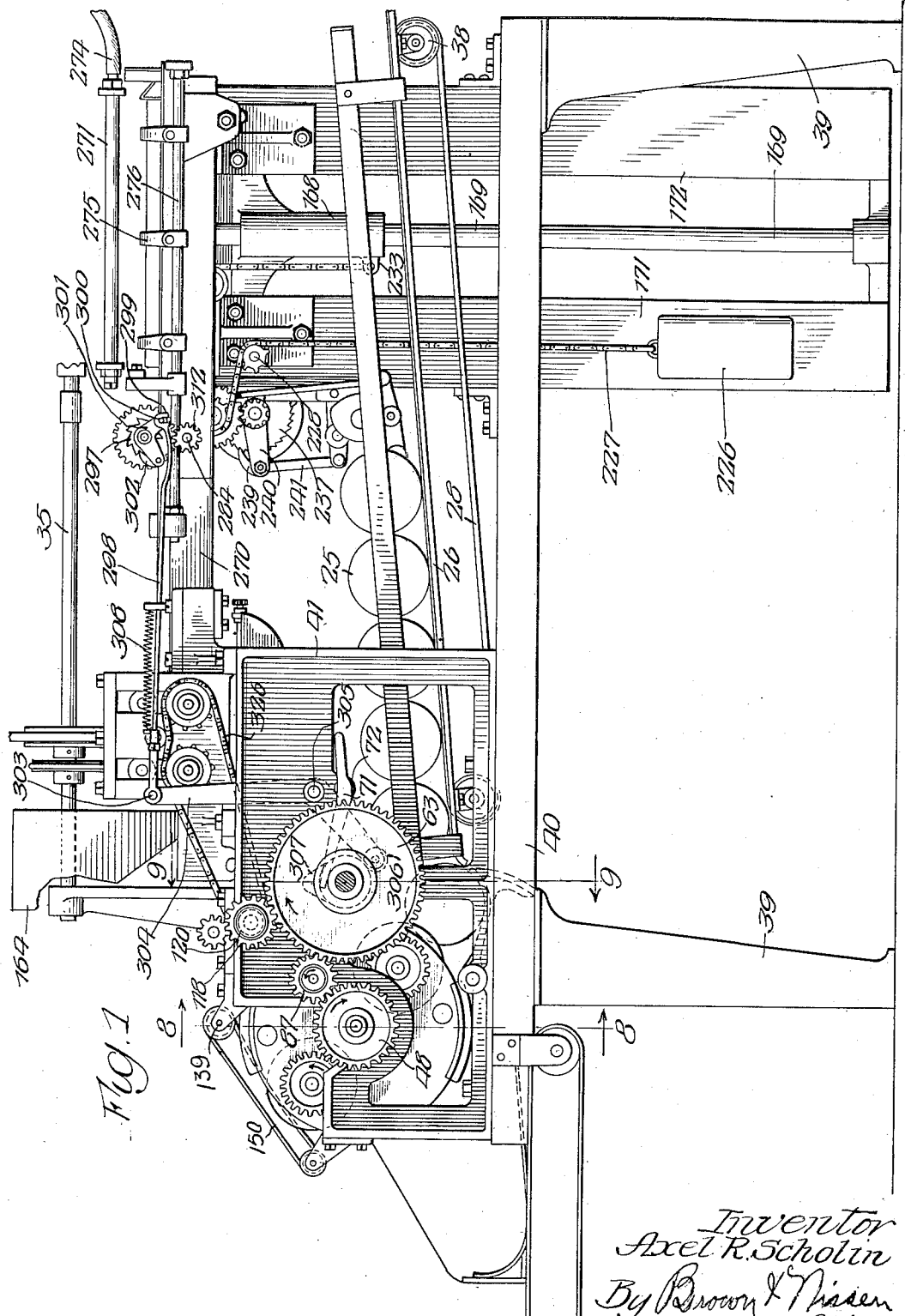
Fig. 1 is a side elevation of a machine embodying one form of the mechanism comprising a part of this invention.
Figure 5:
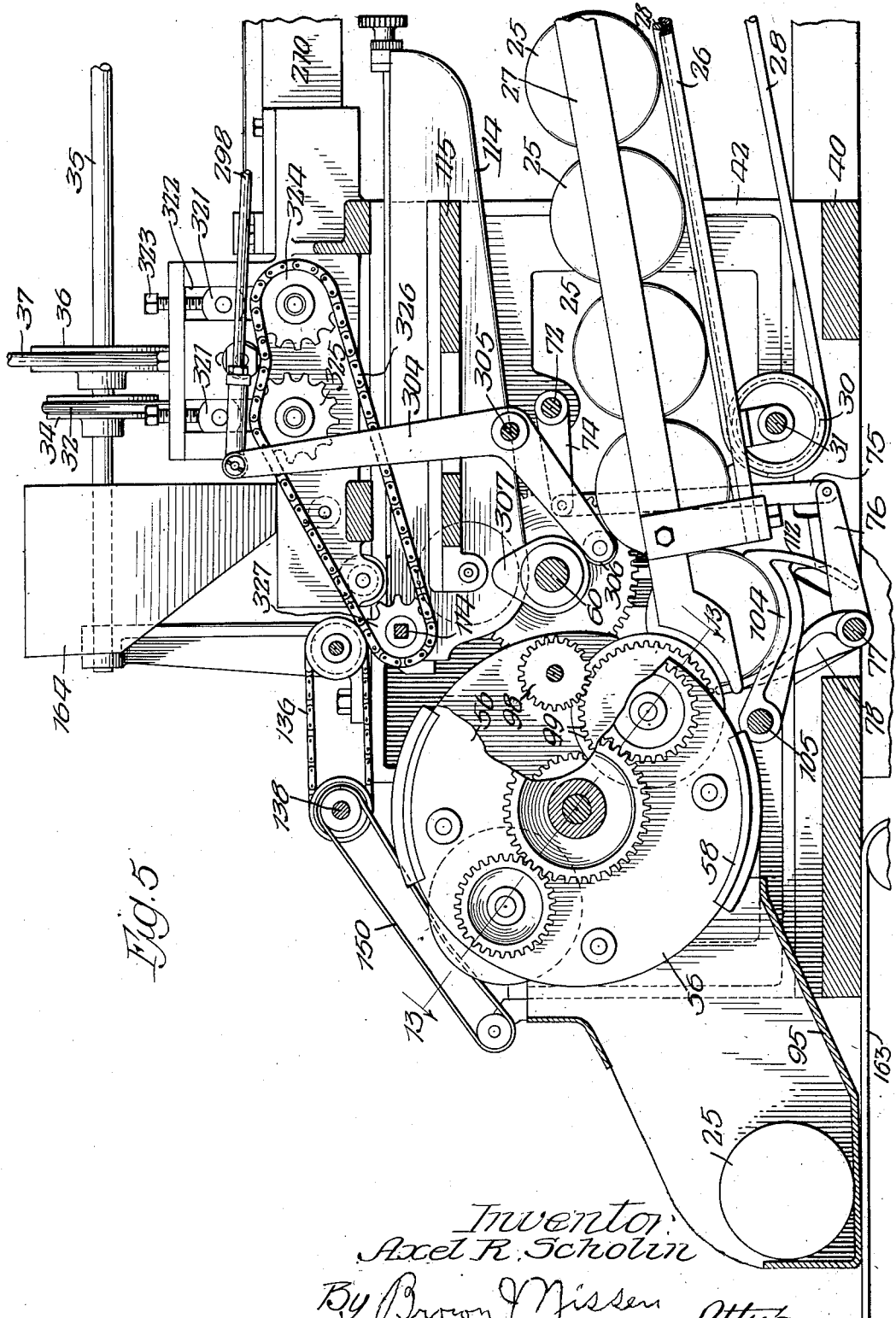
Fig. 5 is a vertical section on line 5—5 of Fig. 3.

The mechanism illustrated in the drawings is designed for handling and wrapping cylindrical containers, but it should be understood that the invention is not confined to containers of any particular shape, but may be adapted to containers of other than cylindrical shape. The containers to be wrapped are designated by the numeral 25 and are fed to the machine along a runway having supporting members 26 and guides 27. Endless belts 28 are preferably arranged to travel in grooves 29 in the supporting members 26, as shown in Figs. 5 and 17. The belts 28 are driven by pulleys 30 secured to a shaft 31, which is in turn driven by a belt 32, Figs. 2 and 6, which belt passes over a pulley 33 on the end of the shaft 31 and over a pulley 34 on a shaft 35 mounted near the upper portion of the machine and driven by a pulley 36 and belt 37 which is connected with any suitable source of power. The ends of the belts 28, opposite pulleys 30, pass over idler pulleys 38, as shown in Fig. 1.

Figure 3:
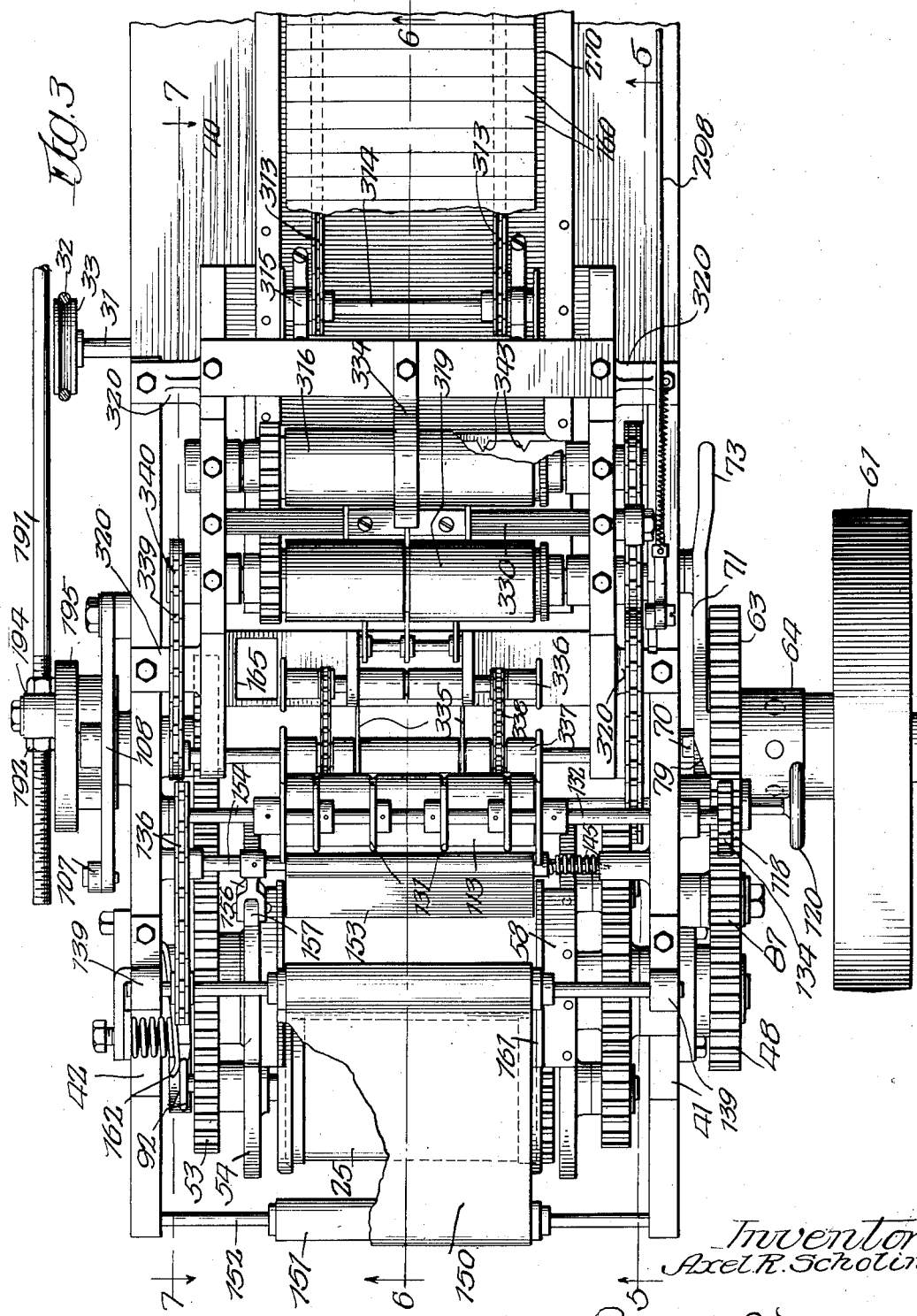
Fig. 3 is a top plan view of one end of the machine shown in Figs. 1 and 2 which will be designated the front end of the machine in this specification.
Figure 6:
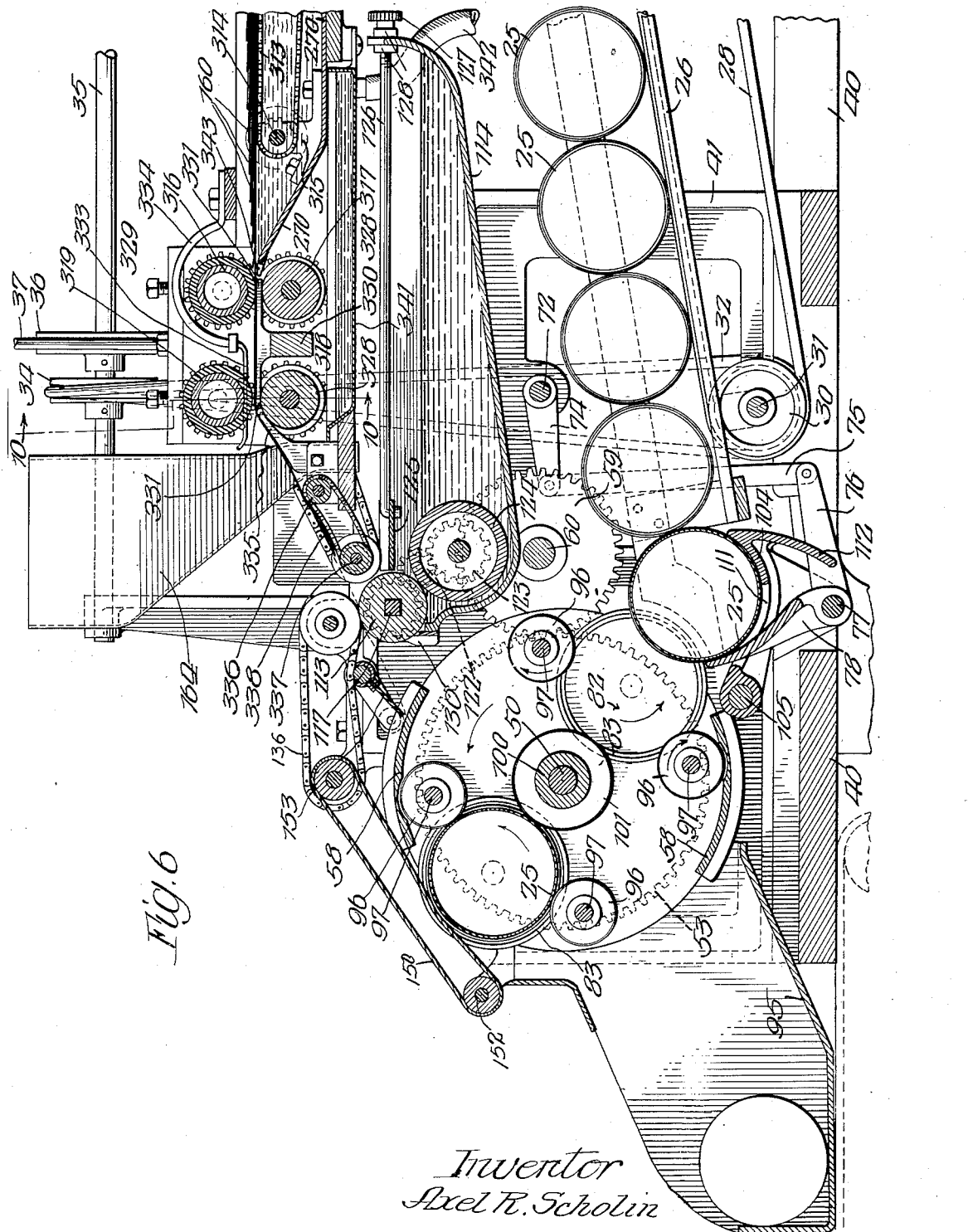
Fig. 6 is a vertical section on line 6—6 of Fig. 3.

The frame of the machine may be supported on legs 39 and includes a skeleton base 40 and side members 41 and 42. The side members 41 and 42 are formed to provide open bearing seats 43 in which bearings 44 and 45 rest and in which they are secured by lag screws 46. It will be apparent that the bearings 44 and 45 may be readily moved into and out of position in their bearing seats by loosening the screws 46. A sleeve 47 is journaled in the bearing 44 and carries a spur gear 48 rigidly secured thereto on the outer side of the frame member 41. A similar gear 49 is rigidly mounted on the inner end of the sleeve 47, as shown in Fig. 8. A shaft 50 upon which the wrapping drum to be described is mounted has one end journaled in the sleeve 47, and has its opposite end held by a sleeve 51 journaled in the bearing 45 and forming the hub for the wrapping drum. The shaft 50 is rigidly secured to the hub 51 by a pin 52 passing through the shaft and hub and also passing through the hub of a spur gear 53 which is thus held rigidly on the hub 51 of the wrapping drum. A disc 54 is carried rigidly on the hub 51 and forms one end of the wrapping drum which is designated generally by the numeral 55. The other end of the wrapping drum 55 is formed by a disc 56 secured to the shaft 50 adjacent the spur gear 49 by means of a pin 57. The two ends 54 and 56 are connected by plates 58 which cover a portion of the periphery of the drum, as shown in Fig. 6. The drum 55 is rotated by the gear wheel 53 which is driven by a gear 59 secured to a shaft 60, Figs. 7 and 9, which shaft is journaled in bearings 61 and 62 in the side members 41 and 42 of the supporting frame. The shaft 60 is provided with a belt pulley 61 loosely mounted thereon and held in place by a collar 62'. A gear 63 is carried by the shaft 60 adjacent the pulley 61 and is provided with an elongated hub 64 rigidly secured to the shaft 60. A clutch bar 65 is mounted to slide longitudinally in an opening in the hub 64, and the end of the clutch bar is arranged to engage notches 66 in the face of the hub 67 of the drive pulley 61. A coil spring 68 is housed in an opening in the clutch bar 65 and bears against a pin 69 to normally force the bar 65 toward the opening 66 in the hub of the pulley wheel 61. The bar 65 is provided with a lug 70 arranged to engage a catch lever 71 rigidly secured to the end of a shaft 72 journaled in the frame members 41 and 42, as shown in Figs. 1 and 3. The latch bar 71 is provided with a handle 73 by means of which the latch may be raised out of engagement with the lug 70 to permit the clutch bar 65 to engage the drive pulley 61 and thus cause the shaft 60 and gear 63 to rotate in unison with the drive pulley. Automatic mechanism for operating the bar 71 is also provided, as will be explained.

As shown in Fig. 6, the shaft 72 carries an arm 74 rigid therewith, the arm having a link 75 pivoted to the outer end thereof which connects the arm 74 with a second arm 76 rigidly secured to a shaft 77 journaled in the supporting frame of the machine near the base plate 40. The shaft 77 has rigidly secured thereto a trip finger 78 positioned in the path of the containers 25 adjacent the discharge end of the chute by which the containers are carried into the machine. The weight of the parts 71, 74, 75 and 76 normally tends to rotate the trip finger 78 in a clockwise direction, as viewed in Fig. 6, so that the finger will stand in a position to be struck by one of the containers 25 whenever a container is introduced into the machine. As soon as this occurs the finger 78 will be rotated in a counter-clockwise direction and the catch bar 71 will be lifted out of engagement with the lug 70 permitting the clutch bar 65 to engage one of the openings 66 in the hub of the drive wheel 61, thus causing the shaft 60, together with the parts driven thereby, to begin to rotate. As long as the finger 78 is held in the position shown in Fig. 6, the pulley 61 will continue to drive the mechanism connected with the shaft 60. If because of the absence of a container the finger 78 is permitted to return to its normal inactive position, the catch bar 71 will drop downwardly upon the inner flange of the hub 64 and the beveled end 79 of the bar will enter between the projection 70 and the face of the gear 63 as the shaft 60 completes a rotation and thus force the bar 65 out of engagement with the drive wheel 61 permitting the machine to come to rest after one complete rotation of the shaft 60. It will be noted that the inner flange of the hub 64 is of greater diameter on one side than it is on the other, as shown at 80 in Fig. 9, so that the bar 71 is held upwardly during the greater part of the rotation of the shaft 60 independently of the action of the container 25 against the trip finger 78. The cam-shaped portion 80 of the hub 64 is so shaped however that it permits the bar 71 to return into position to engage the lug 70 in time to withdraw the clutch member 65 when a single rotation has been completed. It will thus be seen that when the catch bar 71 is once raised, the shaft 60 will be given one complete rotation after which it is automatically disengaged from the drive pulley 61 unless a second container 25 has moved into position against the trip finger 78 to hold the bar 71 out of engagement with the lug 70 while the lug 70 is passing the position adjacent the bar 71. When the machine is operating continuously, the containers 25 travel down the chute 26 in an unbroken stream so that after one of the containers 25 has been moved out of contact with the finger 78 in a manner to be described, a second container falls into position against the trip finger 78 before the shaft 60 has completed a revolution, and thus the machine is caused to operate continuously as long as the containers 25 continue to be fed thereto. When the supply of containers is for any reason discontinued, the operation of the machine is automatically stopped.

Figure 13:
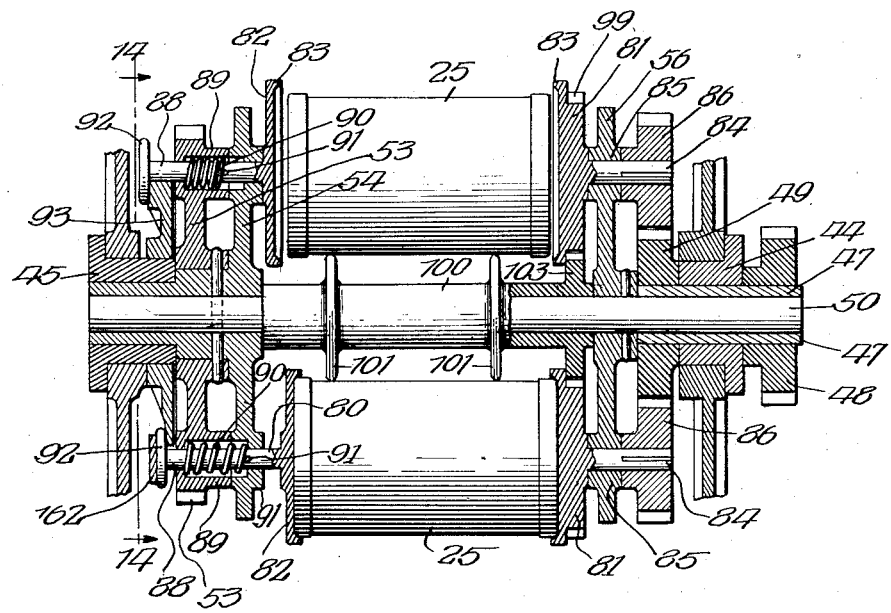
Fig. 13 is a section on line 13—13 of Fig. 5.

The drum 55, as best shown in Figs. 6 and 13, is provided with two pairs of clamping discs 81 and 82 for engaging the ends of the containers 25 so that the containers are successively picked up by the drum and carried about the shaft 50 as the drum rotates thereon to permit the wrapper to be wound upon the container. Each of the clamping discs 81 and 82 is provided with a peripheral flange 83 which overlaps the end of the container 25 when the container is clamped by the discs so as to properly center the container with its axis in alinement with the axis of the discs 81 and 82. Each of the discs 81 is secured to the end of a shaft 84 which is journaled in a bearing 85 formed in the end 56 of the drum 55. The shafts 84 are rotated by spur gears 86 secured to the ends of the shafts on the side of the disc 56, opposite the clamping discs 81, the gears 86 meshing with the gear 49 and being driven thereby independently of the rotation of the drum 55. The gear 49 derives its rotation through the sleeve 47 from the gear 48, the gear 48 being driven by an idler 87 from the gear 63, as shown in Fig. 1. By this mechanism the discs 81 are caused to rotate upon their own axes while they revolve about the shaft 50, and when the containers 25 are clamped between the discs 81 and 82, the containers also are rotated by the discs 81 at the same time that they are carried by the drum 55 about the shaft 50.

Figure 14:
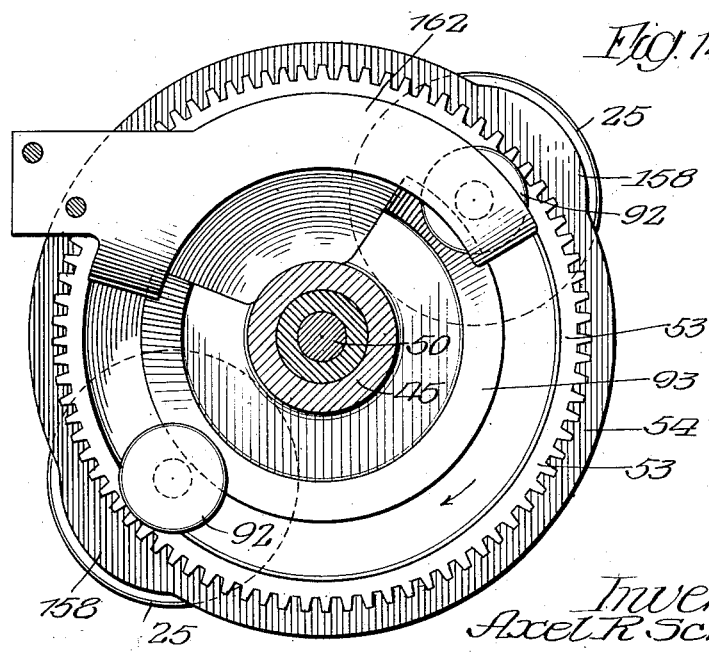
Fig. 14 is a vertical section on line 14—14 of Fig. 13.

The discs 82 are carried on spindles 88 which extend through alined openings in the end member 54 of the drum 55 and the gear 53 by which the drum is rotated. Projections are provided on the gear 53 and disc 54 which are hollowed out to form housings 89 which contain springs 90 surrounding the spindles 88 and bearing against pins 91 in the spindles 88 to force the spindles and their disc 82 inwardly into engagement with the ends of the containers 25. The outer ends of the spindles 88 carry discs 92 which are engaged by a cam 93 secured to the bearing 45 by set screws 94, as shown in Fig. 8. The cam 93, as shown in Figs. 13 and 14, is so shaped that it enters beneath the discs 92 of the spindles 88 and holds the spindles and their discs 83 away from the end of the containers 25 during a portion of the rotation of the drum 55, but permits the holding discs 83 to engage the ends of the containers during the remainder of the rotation of the drum. The cam 93 is shaped to withdraw the holding discs 83 from their clamping position when the discs are adjacent the end of the chute 26 so that the containers may be moved into position between the clamping discs. A slight rotation from the receiving position of the drum moves the disc 92 on the cam 93 a sufficient amount to permit the clamping discs 82 to engage the containers 25, and the clamping discs remain in this position until the containers have been brought by the drum into a position adjacent a discharge chute shown at 95 in Fig. 6 of the drawings. At this point in the rotation of the drum, the clamping disc 83 is again withdrawn from engagement with the end of the container, and the container permitted to fall into the discharge chute.

In order to properly center the containers in position in the wrapping drum and to assist in rotating the containers and positioning the wrappers thereon, a plurality of rollers 96 are mounted on shafts 97 in position to engage the periphery of the containers. The shafts 97 have their ends journaled in the ends 54 and 56 of the drum 55, as shown in Fig. 8, and each shaft is provided with a pinion 98 which meshes with a gear 99 formed on the periphery of the clamping disc 81, as shown in Figs. 5 and 13. The pitch circle of the gear teeth 99 is of the same diameter as the outer periphery of one of the containers 25, while the pitch circle of the teeth on the pinion 98 is of the same diameter as the outer periphery of the rollers 96. This arrangement causes the periphery of the rollers 96 to bear against the periphery of the containers 25 and rotate at the same linear speed therewith. A sleeve 100 is loosely mounted on the shaft 50 between the ends 54 and 56 of the drum 55 and is provided with discs 101 of a proper diameter to engage the inner sides of the containers 25 when they are in position in the clamping discs 81 and 82. The sleeve 100 has formed thereon at one end a gear 103 arranged to mesh with the teeth 99 on the discs 81 so that the discs 101 are rotated by the gear 103 to travel in unison with the periphery of the containers 25 which they engage.

Figure 2:
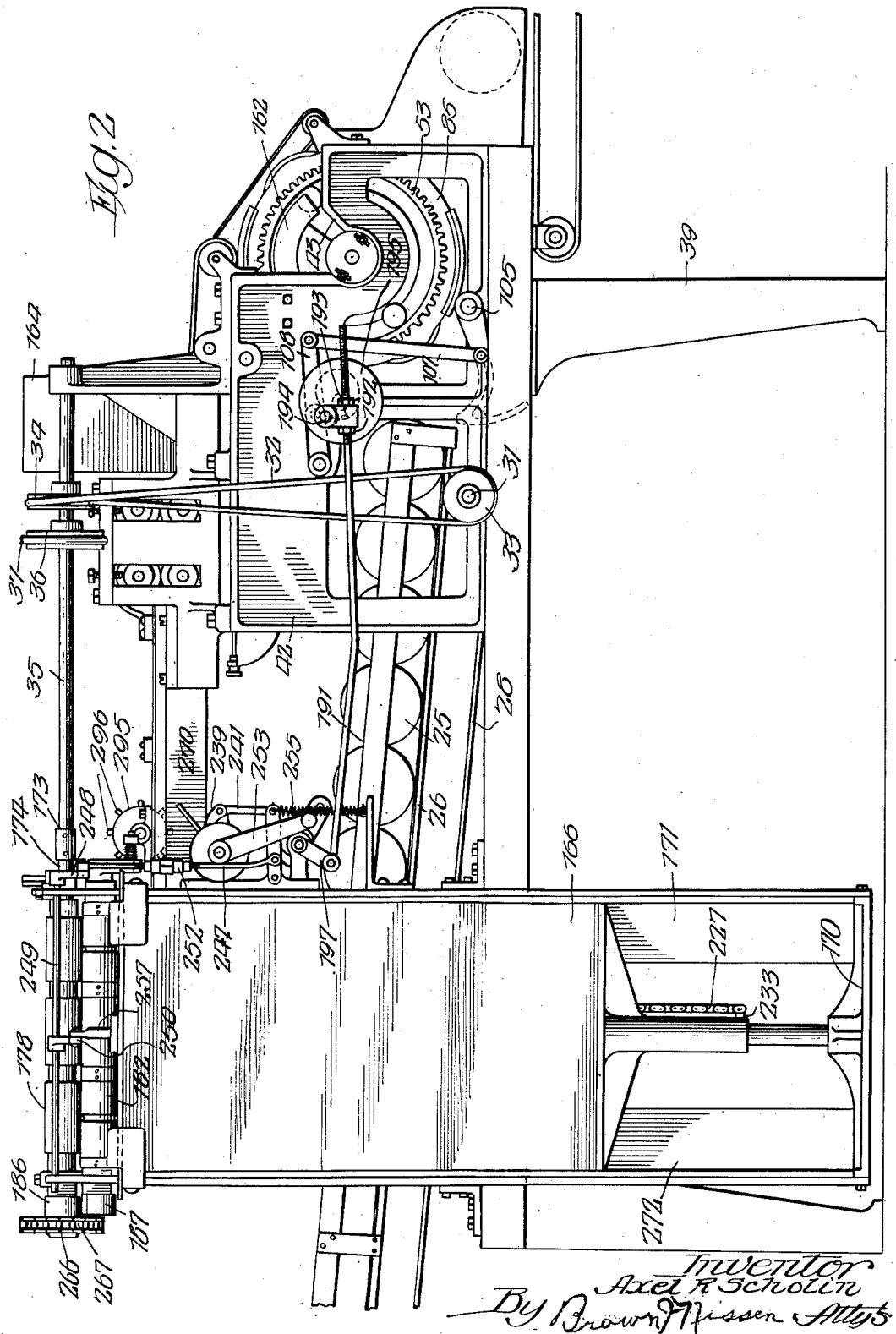
Fig. 2 is an elevation of the machine shown in Fig. 1 looking at the side of the machine opposite that shown in Fig. 1.

The mechanism for receiving the containers 25 from the chute 26 and moving them into position in the wrapping drum 55 is illustrated in Figs. 2, 6 and 9. The containers 25 as they are discharged from the end of the chute 26 are received upon a tilting platform 104 which is rigidly mounted on a shaft 105 journaled in the side members 41 and 42 of the supporting frame. The shaft 105 is rocked by an arm 106, Fig. 9, to which a link 107 is pivoted, the upper end of the link being pivoted to an arm 108 which is provided with a roller 109 arranged to travel upon a cam 110 rigidly secured to the main drive shaft 60. By this arrangement the platform or receiver 104 is tilted upwardly about the shaft 105 as an axis, once for each rotation of the drive shaft 60. Since the ratio of the gears 59 and 53 is 1 to 2, it follows that the receiver 104 will be tilted upwardly twice for every revolution of the wrapping drum, and the parts are so timed that the upward movement of the platform will take place when the clamping discs 81 and 82 are in position to receive the container carried thereby. It will be noted from Fig. 6 that the tripping finger 78 projects upwardly through a slot 111 in the receiving platform 104, so that the tripping finger may engage the container held by the platform. An arcuate plate 112 extends downwardly from the edge of the receiving platform 104 in position to engage the container 25 at the end of the chute 26 during the upward movement of the receiving platform so that the line of containers in the chute 26 will be held backwardly against their downward movement until the receiving platform is again in its lowermost position.

The wrappers to be placed upon the containers 25 are first soaked and stretched by mechanism to be described and then fed to the wrapping drum over a glue roll 113. The glue roll 113 is rotatably mounted at the front end of a glue pot 114 which is supported by flanges 115 projecting inwardly from the frame members 41 and 42, as shown in Fig. 10. The ends of the glue roller 113 project into bearings 116 carried by the edges of the glue pot 114, as shown in Fig. 9, and the roller is provided with a central squared opening into which a square shaft 117 projects, as shown in Figs. 6 and 9. A gear 118 is supported by a bearing 119 and projects at one side of the frame member 41, as shown in Figs. 1 and 9, in position to mesh with the main driving gear 63. The gear 118 is provided with a square opening alining with the opening in the glue roll 113. The square shaft 117 is provided with a knob 120 by which the shaft may be inserted through the opening in the gear 118 and into the opening in the roll 113. When the shaft 117 is in place the roll 113 will be driven by the gear 118 and the squared shaft may be withdrawn from engagement with the roll to permit the glue pot 114 to be slid longitudinally along its supporting flanges 115 and withdrawn from the machine for cleaning or other purposes. The end of the glue roll 113 is provided with a gear 121 which meshes with an idler 122, Fig. 6, which in turn meshes with a gear 123 on the end of a second roll 124 journaled in the front end of the glue pot 114 in position to contact with the roll 113. The roll 124 is immersed in the glue within the pot 114 and carries it upwardly and deposits a coating of glue on the roll 113. The amount of glue on the roll 113 is regulated by a scraper 125 which may be slid toward and away from the roll 113 by a rod 126 controlled by a thumb nut 127 and lock nuts 128. It will be noted that both rolls 113 and 124 rotate in a counterclockwise direction, as viewed in Fig. 6, so that the contracting surfaces move in opposite directions to one another. This insures a thorough coating of the upper roll and also gives the proper direction of rotation of this roll to feed the paper forwardly in the machine, while the lower roll moves upwardly on its rear side so that the glue in the pot is not caused to run over at the front edge of the pot as might occur if the roller rotated in the opposite direction. The glue roll 113 is provided with a series of grooves in its periphery shown at 129 and a series of fingers 130 project upwardly from the front edge of the glue pot and extend into the grooves 129 in order to strip the paper from the roll in case it tends to adhere thereto. A series of discs 131 are mounted on a shaft 132 journaled in bearings 133 on the upper edges of the frame members 41 and 42. The shaft 132 is driven by a gear 134 which meshes with the gear 118. The discs 131 are arranged in alinement with the grooves 129 in the roller 113 and may be arranged to extend slightly into these grooves below the periphery of the glue roll. The paper as it passes over the glue roll 113 is pressed into engagement therewith by the discs 131 to insure a proper coating of glue. The grooves 129 prevent contact between the discs 131 and the surface of the roll so that the discs do not become covered with glue when there is no paper between the discs and the roller. The shaft 132 carries a sprocket wheel 135 which drives a chain 136 passing over a sprocket wheel 137 on a shaft 138 journaled in bearings 139 on the machine frame. The shaft 138 carries a roller 140 over which an apron 150 travels. The apron 150 is supported at its forward end on a roller 151 mounted to rotate on a shaft 152. A wiper 153 is secured to a disc shaft 154 extending transversely of the frame of the machine, as shown in Fig. 3, and provided with a spring 155 which normally tends to move the wiper 153 downwardly in the direction of the wrapper drum. An arm 156 is secured to the shaft 154 and carries a roller 157 arranged to bear on the periphery of the disc 54 forming the end of the wrapper drum. As will be seen from Fig. 14 the disc 54 is provided with a pair of cams 158 extending upwardly above the outer edge of the disc, the cams being located adjacent the clamping members 82 for the containers 25. It will also be seen from Fig. 14 that the containers 25 when in place in the wrapper drum extend slightly beyond the periphery of the disc 54, and the cams 158 are for the purpose of raising the wiper 153 to permit it to properly engage the peripheries of the containers 25 when they are brought adjacent the wiper by the rotation of the wrapper drum.

The operation of the wrapping mechanism will probably be best understood from Figs. 11 and 12. In Fig. 11 a wrapper 160 is shown as it is being fed toward the glue roll 113. As the wrapper passes over the roll its lower surface is coated with adhesive and its forward end is projected toward the wrapper drum 55 just as one of the containers 25 is moved upwardly to a position opposite the glue roll. The surface of the forward end of the wrapper covered with adhesive comes into contact with the outer periphery of the container 25, and the movement of the container both about its own axis and about the shaft 50 tends to draw the wrapper into position upon the outer surface of the container. The wiper 153 bears against the upper surface of the wrapper and tends to direct it against the periphery of the container. The roller 157 bearing upon the cam 158 controls the wiper 153 so that it will accommodate itself to the contour of the surface of the container. When the container has moved sufficiently to withdraw the rear end of the wrapper 160 from between the rolls 113 and 131 the rear end of the wrapper will fall downwardly upon the upper surface of the plate 58 which travels with the wrapper drum 55 in a position slightly in the rear of the container. The adhesion of the coated surface of the wrapper upon the surface of the plate 58 will be sufficient to draw the wrapper tightly upon the container 25 as it is wound thereabout. The plates 58 are provided with flanges 161 at their edges which engage the edges of the wrapper to be directed onto the container 25 as the wrapper is drawn from the surface of the plate 58. The final smoothing to the wrapper is imparted to it by the apron 150 which is driven in the same direction as the movement of the surface of the container with which it contacts, but which travels at a lower speed than the surface of the container. After the container with the wrapper in place has passed the apron 150 it reaches a position adjacent the discharge chute 95 in which position it is released by the action of the cam 93 and permitted to fall into the chute. During the time that the container is clamped between the discs 81 and 82 by means of the springs 90 an additional pressure is imparted to the clamping disc by a flat spring 162 shown in Figs. 13 and 14 which bears against the outer surface of the discs 92. When the containers 25 with their wrappers in place have been discharged into the chute 95 they may be removed from the chute by hand or automatically and placed upon the conveyer represented in Fig. 5 at 163 and carried to any desired position for shipment or storage. Adhesive material is supplied to the glue pot 114 through a hopper 164, the lower end of which extends through an opening 165, Fig. 3, into position to discharge into the glue pot.

The wrappers for the containers 25 are furnished from a stack 166 which is supported upon a platform 167 provided with a sleeve 168 arranged to slide vertically upon a standard 169 having its lower end resting upon a yoke 170 supported from the frame of the machine near the rear end thereof by angle plates 171 and 172 which form guides for the stack of wrappers 166 as they are moved upwardly. The wrappers are fed one at a time from the upper surface of the stack 166 by mechanism driven by the shaft 35. The shaft 35, as shown in Fig. 21, is connected by a coupling 173 to a shaft 174 journaled in bearings 175, see also Fig. 15, which bearings are free to slide vertically in guide slots 176 and are held in position by set screws 177. The shaft 174 carries a roller 178 rigidly secured thereto which is provided with circumferential grooves 179 distributed at spaced intervals along its length. A second shaft 180 is journaled in bearings 181 also held in the guide slots 176, and the shaft 180 is provided with a series of short rollers 182 rigidly secured to the shaft and distributed along its length in positions registering with the circumferential grooves 179 in the roller 178. Alternating with the short rollers 182 is a series of longer rollers 183 which are free to rotate upon the shaft 180 and which are provided with balls 184 to provide anti-friction bearings between the rollers and the shaft. The short rollers 182, as shown in Fig. 18, are provided with rubber inserts 185 extending circumferentially about the rollers for a portion of their peripheries. The rubber inserts 185 project sufficiently from the peripheries of the rollers 182 to enter the grooves 179 in the roller 178 when they are rotated into a position adjacent the upper roller. The shafts 174 and 180 are provided adjacent one end of each shaft with cylinders 186 and 187, respectively, which are covered with rubber or other frictional material, as shown at 188 and 189 in Fig. 19 of the drawings. The frictional material 189 on the shaft 180 is cut away for a portion of the periphery of the roller 187, as shown at 190. When the cut-away portion of the roller 187 is opposite the roller 186, the two rollers will not contact with one another and the lower shaft will not be rotated by the rotation of the upper shaft, but when the lower shaft is given a sufficient initial rotation to bring the material 189 into engagement with the surface of the upper roller, the two cylinders 186 and 187 will then constitute a friction drive between the two shafts and the lower shaft will be rotated until the cut-away portion 190 is again brought opposite the upper cylinder 186. The upper roller 178 is rotated continuously as are also the lower rollers 183, but the short rollers 182 are only rotated after the shaft 180 has been given an initial movement by mechanism to be described so that the two friction cylinders 186 and 187 are brought into driving relation with one another.

The initial movement of the shaft 180 referred to above is produced by mechanism shown in Figs. 2, 15, 16 and 21. A rod 191 has one end adjustably connected by nuts 192 with a block 193 connected with a wrist pin 194 carried on a disc 195 secured to the end of the main drive shaft 60, see also Fig. 3. The rod 191 reciprocates an arm 197 secured to a shaft 198 journaled in bearings 199 projecting from the angle plate 171. The shaft 198 carries a cam 200 secured to the end thereof opposite the arm 197 and the cam 200 bears upon a roller 201 carried by a rocker arm 202 pivoted at 203 to a projecting portion 204 of one of the bearings 199, and a coil spring 205 wound about the pivot 203 resiliently presses the roller 201 into engagement with the cam 200. A rod 206 has its lower end pivotally connected with the end of the rocker arm 202 and has its upper end pivoted to a bell crank lever 207 which reciprocates on a pin 208 carried by a projection 209 formed on the support for the shafts 174 and 180. The lower end of the bell crank carries a pin 210 on which is pivoted a dog 211 and about which is wound a coil spring 212 connected with the dog 211 arranged to hold it resiliently in an approximately horizontal position. The dog 211 is provided with a lug 213 which engages the nose of a wiper 214 rigidly secured to the end of the shaft 180. Whenever the cam 200 is rocked by the movement of the rod 191, which is once for each rotation of the main drive shaft, the dog 211 will move the wiper 214 a short distance to the left, as viewed in Fig. 16, and this movement of the wiper 214 will rotate the shaft 180 sufficiently to bring the friction coating 189 on the drum 187 into contact with the rotating drum 186 so that the rotation of the shaft 180 will be continued by the action of the drum 186 until the shaft has made a complete revolution and has been brought back into position with the cut-away portion 190 opposite the drum 186. This rotation of the shaft 180 will carry the wiper 214 through a complete revolution, the complete revolution, the cam-shaped surface of the wiper passing over the lug 213 and coming back into a position in engagement with the lug so that it will be ready for the next oscillation of the dog 211.

Near the top of the pile of wrappers 166 and adjacent the front edge of the uppermost wrappers of the pile, a beam 215 supported by the frame of the machine extends along the forward edge of the pile of wrappers and is provided with a recess 216 in which a bar 217 is fitted. The bar 217 is rounded at its lower edge, as shown at 218, to provide a pivotal support about which the bar may oscillate and a circular lug is formed on one end of the bar 217 in alinement with the axis of oscillation of the bar and projects through the frame of the machine and carries at its outer end a lever arm 219 which is arranged to engage a finger 220 secured to the shaft 180 adjacent the wiper 214. Each time the shaft 180 is rotated by the mechanism described, the finger 220 engages the lever arm 219 and gives it a partial rotation to the left, as viewed in Fig. 15. This movement of the arm 219 will rock the bar 217 into the position shown in broken lines in Fig. 18. This movement of the bar 217 will press the edges of a number of the uppermost sheets of the pile 166 rearwardly so that these sheets will buckle, the uppermost sheet taking the position approximately shown by the broken line 221 in Fig. 18. In order to prevent the edges of the uppermost sheets from sliding forwardly over the top of the bar 217 when it is oscillated, the bar is provided with a series of notches cut in its upper edge through which teeth 222 supported on the beam 215 project. The lower edge of the teeth 222 are beveled to guide the edges of the sheets into their proper position when they are returned after a compression by the bar 217, and the bar 217 is provided with a series of shorter teeth 223 which alternate with the teeth 222 and which engage the upper edge of the uppermost sheet when the bar is oscillated.

It will be seen from Figs. 15 and 16 that the bar 217 is oscillated to buckle the uppermost sheets in the pile 166 at the beginning of the rotation of the shaft 180, and it will be seen from the relative position of the cut-away portion 190 and the rubber insert 185, as shown in Fig. 20, that the projecting portion of the rubber insert will be brought into engagement with the upwardly buckled top sheet of the pile 166 immediately after the beginning of the rotation of the shaft 180 and the short rollers 182. As the rollers 182 continue to rotate in the direction of the arrow in Fig. 18, the uppermost sheet on the pile 166 will be turned backwardly into the position shown in full lines at 224 in that figure. The buckling of the sheets tends to separate them from one another, and since the pressure of the rubber insert 185 is resisted only by the spring in the paper wrappers, it will be apparent that but a single sheet will be bent backwardly by the rotation of the rubber insert. As the shaft 180 continues to rotate from the position shown in Fig. 18, the forward edge of the wrapper 160 will be carried upwardly past the center of the shaft 180 and will finally be flipped upwardly by the resiliency of the paper to bring the edge of the wrapper between the rollers 178 and 183 which are, as previously stated, continuously rotated. The front edge of the wrapper will then be grasped by the rotating rollers and fed forwardly between the rollers from the top of the pile 166. A plate 225 rests on the rear portion of the pile 166 and holds the uppermost wrapper 160 from sliding rearwardly off of the pile under the action of the rubber insert, and when the wrapper is finally drawn forwardly by the action of the rollers it is slid from beneath this plate 225. When the forward edge of the wrapper 160 is flipped into position to be grasped by the rollers 178 and 183, the greater part of the rubber insert 185 will be rotated past the line of centers of the shafts 174 and 180 so that the wrappers 160 will not be creased by being pressed into the grooves 179 by the rubber 185. By this mechanism a single wrapper is taken from the top of the pile 166 and fed between the rollers 178 and 183 for each half rotation of the wrapping drum 55 so that a wrapper is supplied for each container handled by the wrapping drum.

Figure 4:
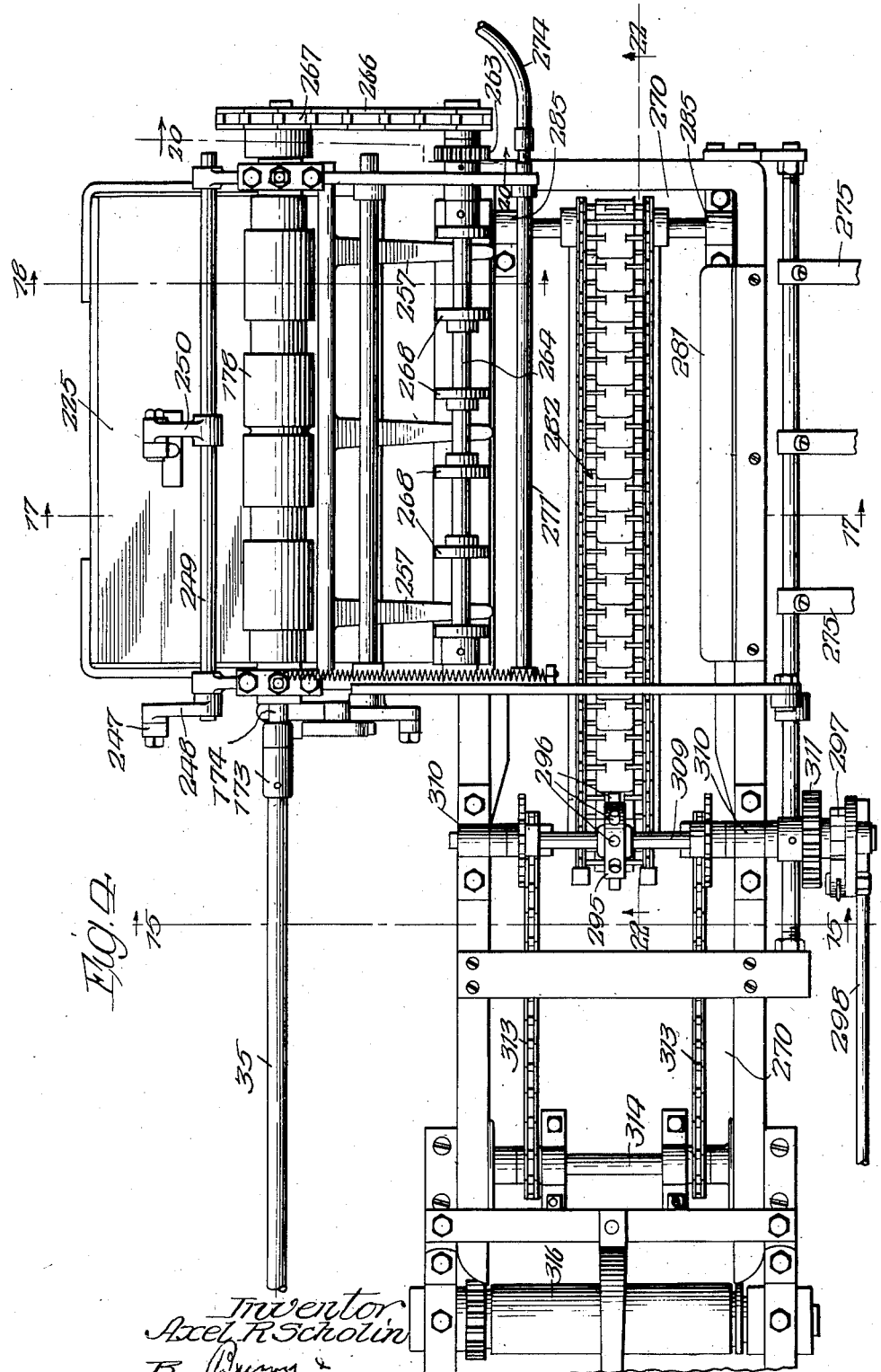
Fig. 4 is a top plan view of the rear end of the machine, the front portion of which is shown in Fig. 3.

The support 167 for the pile of wrappers 166 is counterbalanced by a weight 226, Fig. 1, secured to the end of a chain 227 passing over a sprocket wheel 228 carried by the plate 171. The chain 227, as shown in Fig. 21, passes around a sprocket wheel 229 secured to a shaft 230, and thence over a guide roller 231 on a bracket 232, and from the guide roller 231 it extends downwardly and is secured, as shown in Figs. 1 and 2, to a lug 233 carried by the sleeve 168 of the support 167. The shaft 230, as shown in Figs. 15, 16 and 21, carries a gear wheel 234 rigidly secured thereto, which meshes with a pinion 235 on a shaft 236. The shaft 236 is provided with a ratchet wheel 237 which is held against rotation by a pawl 238 which thus sustains the weight of the stack of wrappers 166. An operating pawl 239 is provided for the ratchet wheel 237 which automatically rotates the ratchet wheel to maintain the top of the stack 166 at a constant level. The pawl 239 is carried by the end of a lever arm 240, which also has a link 241 pivotally connected therewith. The lower end of the link 241 is pivotally connected to a rocker arm 242 which carries a roller 243 arranged to bear upon a cam 244 secured to the shaft 198. The rocker arm 242 is rigidly connected with a shaft 245 which also carries an arm 246 connected with an upwardly extending rod 247. The upper end of the rod 247 is connected to an arm 248 secured to a shaft 249 which carries an arm 250 connected by a link 251 with the plate 225, as shown in Figs. 4 and 15. The upwardly extending rod 247 is provided with a turnbuckle 252 for adjusting its length when necessary. It will be apparent that for each oscillation of the rod 191 the roller 243 will be raised to a certain height by the action of the cam 244 and that this movement of the roller 243 will force the pawl 239 forwardly to a definite position. The backward movement of the pawl will be controlled by the rod 247 which will depend upon the position of the plate 225. If the papers in the stack 166 are high enough, the pawl 239 will be prevented by the rod 247 from moving backwardly an amount equal to the width of one of the notches in the ratchet wheel 237 during an oscillation of the cam 244, but as the papers are withdrawn from beneath the plate 225, the plate will gradually sink lower and lower so that at each oscillation the pawl 239 moves backwardly a slight distance farther than it did at the previous oscillation, and when a sufficient number of papers have been removed, the pawl will move backwardly an amount equal to the width of a notch in the ratchet wheel 237, and hence will engage the ratchet wheel one notch further back than the notch previously engaged. When this occurs, the ratchet wheel 237 will be rotated one notch during the forward movement of the pawl 239, and this rotation of the ratchet wheel will be transmitted to the chain 227, which will in turn lift the support 167 and thus raise the papers in the pile 166. In this way the papers in the pile 166 are automatically maintained at a substantially uniform height so long as the machine continues to operate. The shaft 236 may be provided with a handle 253 by which the position of the support 167 may be manually adjusted when desired. The link 251 is preferably provided with telescoping sections, as indicated at 254, so that the plate 225 will afford a limit to the downward movement of the rod 247 and yet will not be lifted by the upward movement of the rod. A coil spring 255 may be secured to the end of the link 241, as shown in Fig. 21, for positively drawing the pawl 239 rearwardly after each oscillation of the rocker arm 242, and the pawls 238 and 239 may be provided with the usual springs 256 for holding them against the ratchet wheel 237.

The wrappers as they are projected from the rollers 178 and 183 are directed by guides 257 and 258 over a roller 259 journaled in brackets 260. The roller 259 is carried on a shaft 261 which is provided with a gear 262. Figs. 19 and 22. The gear 262 meshes with a gear 263 on a shaft 264 also journaled in the brackets 260 above the shaft 261. The shaft 264 carries a sprocket wheel 265 which is driven by a chain 266 which is in turn driven by a comparatively large sprocket wheel 267 secured to the end of the shaft 174. The shaft 264 is provided with a plurality of disc rollers 268 arranged to register with grooves 269 in the roller 259, as shown in Fig. 22. The rollers 259 and 268 rotate at a comparatively rapid rate of speed because of the driving ratio between the sprockets 265 and 267 so that when a wrapper is grasped between the rollers 259 and 268, the rollers will slide somewhat over the surface of the wrapper until its rear end is free from the rollers 178 and 183. After the rear edge of the wrapper has been freed from these rollers, it will be shot forwardly at a comparatively rapid rate of speed and discharged from the rollers 259 and 268. As the wrapper passes between these last mentioned rollers, it is creased by the projection of the rollers 268 into the depressions 269 so that a plurality of channels is formed in the wrapper. This gives the wrapper a rigidity against bending downwardly so that it is projected in an almost horizontal plane from the two rollers and does not drop downwardly to any extent until it has been discharged from the rollers with an impulse which carries it some little distance away from its point of discharge.

The wrappers 160 are discharged from the rollers 259 and 268 into a tank 270 filled with water and in which the wrappers are thoroughly moistened. A pipe 271 is supported on brackets 272 above the tank 270 and is provided with a plurality of perforations 273. Hot water preferably at approximately boiling temperature is supplied to the pipe 271 from any suitable source through a tube 274 and is discharged from the perforations 273 in a plurality of sprays upon the wrappers in the tank 270. The water from the pipe 271 also falls upon the wrappers as they are discharged from the rollers 259 and 268. A presser frame 275 is pivoted on a rod 276, Figs. 15 and 17, and the rod 276 is provided with an arm 277 which projects upwardly therefrom and has its upper end pivoted to a link 278 which is connected at its rear end with an arm 279 formed rigidly with the bell crank 207. A coil spring 280 normally operates to draw the arm to the left, as shown in Fig. 15, which movement brings the presser frame 275 downwardly upon the upper surface of the wrappers 160 in the tank 270, as shown in Fig. 17, and presses the wrappers into proper contact with one another in the water in the tank. At the time of the discharge of the wrappers into the tank, the frame 275 is raised into the position shown in broken lines in Fig. 17 by the movement of the bell crank 207. In Fig. 4 the frame 275 is shown rotated backwardly out of operative position in order to give a better view of the parts of the mechanism beneath the frame.

The wrappers 160 are supported in the tank 270 near the upper surface of the water in the tank by shelves 281 projecting inwardly from the sides of the tank, as shown in Figs. 4 and 17, and also by a conveyer 282 which extends longitudinally of the tank at the center thereof and which gradually moves the wrappers in the tank forwardly through the water. The construction and operation of the conveyer 282 will best be understood from Figs. 4 and 22. A pair of shafts 283 and 284 are journaled in bearings 285 and 286, respectively, secured to the bottom of the tank 270. Each of the shafts 283 and 284 carry sprocket wheels 287 and 288, respectively, over which the conveyer chains 289 travel. The links of the chains 289 are connected by cross-rods 290. Every alternate rod 290 is provided with a gripping plate 291 pivotally mounted thereon and provided with an operating tailpiece 292 which bears against a plate 293 over which the chains 289 travel. During the straightaway portion of the run of the conveyer each gripping plate 291 is held against the cross-rod 290 immediately in front of the rod on which it is pivoted by the action of the tailpiece 292 against the plate 293. At each end of the conveyer, the curved portion 294 of the plate 293 is spaced inwardly from the path of the conveyer a greater distance than it is along the straightaway portion of the conveyer run. For this reason the gripper plates 291 are permitted to fall away from the cross-bars 290 as they round the turn at the end of the conveyer preparatory to entering the forward run, as illustrated at the right of Fig. 22. When a wrapper is discharged into the tank 270 it falls upon the conveyer 289 with its rear edge just in front of one of the released gripper plates 291 which engages the rear edge of the wrapper and carries it forwardly with it until the tailpiece 292 of the partical gripper plate forces the plate downwardly against the cross-rod in front of the plate, and in this way the rear edge of the wrapper is gripped between the cross-rod and the gripper plate, and the wrapper is moved forwardly upon the conveyer while thus held by the gripper plate. A wrapper is discharged into the tank each time a gripper plate 291 is brought into receiving position by the conveyer, and each wrapper is carried forwardly by the conveyer a distance equal to the distance between the gripper plates before a subsequent wrapper is received upon the conveyer. In this way the wrappers are arranged in offset relation upon the conveyer 289 so that the pile of wrappers on the conveyer overlie one another, but each wrapper has its rear edge projecting backwardly from the pile beyond the wrappers beneath it, the uppermost wrapper being always the farthest back upon the conveyer. It follows from this that the forward edges of the wrappers will also be arranged in offset relation to one another, and the lowermost wrapper in the pile will have its forward edge projecting beyond the wrappers superimposed upon it. At the front end of the conveyer 289 there is located a rotary feed wheel 295 which is provided with spring-pressed fingers 296 arranged to bear upon the upper surface of the pile of wrappers and assist in holding them in place and feeding them forward. The feed wheel 295 is given an intermittent movement as is also the conveyer 289 by a ratchet 297, Figs. 1 and 4, operated by a reciprocating rod 298. The rod 298 is provided with a hook 299 which engages a pin 300 on a bell crank 301 which carries a pawl 302 arranged to drive the ratch wheel 297. The forward end of the rod 298 is pivoted at 303 on the upper end of an arm 304 journaled at 305 on the frame plate 41 and provided with a roller 306, see also Fig. 5, arranged to engage a cam 307 secured to the main drive shaft 60. A spring 308 normally draws the rod 298 to the right, as viewed in Fig. 1, and holds the roller 306 against the cam 307. The ratchet wheel 297 and the feed wheel 295 are both rigidly secured to a shaft 309 mounted in bearings 310, and a gear wheel 311 is carried by the shaft 309 and meshes with a gear wheel 312, Fig. 1, on the shaft 284, by which the conveyer 289 is driven. A pair of sprocket chains 313, Figs. 3 and 4, travel over sprocket wheels on the shaft 284 and have their forward ends guided over similar wheels on a shaft 314, see also Fig. 6, carried in bearings 315 near the front end of the tank 270. As the forward ends of the wrappers 160 are projected forwardly from the end of the conveyer 289, they are received by the conveyer chains 313 and supported in their forward movement, as shown in Figs. 3 and 6. As the rear edge of each wrapper is brought to the front end of the conveyer 289, the edge is released from the clamping plate 291, and about the same time the front edge of the wrapper is grasped by a pair of rollers 316 and 317, as shown in Fig. 6. The rollers 316 and 317 cooperate with a similar pair of rollers 318 and 319 for wringing the excess of water from the wrappers and for stretching the wrappers so that when they have been placed upon the containers they will contract in drying, and thus be stretched evenly and tightly in position about the periphery of the containers. The wringer rollers are mounted in bearing members carried by brackets 320 supported upon the side plates 41 and 42, as shown in Figs. 3 and 7, and the rollers 316 and 319 have their bearings 321 mounted in slots 322 in the bearing blocks and held in position by screws 323. The lower rollers 317 and 318 are provided with sprocket wheels 324 and 325 over which a sprocket chain 326 travels by means of which the wringer rollers are driven. The sprocket chain 326 is driven by a sprocket 327 rotated by the squared shaft 114, as shown in Fig. 5. The rollers 317 and 318 have grooves 328 formed in their peripheries, as shown in Figs. 6 and 10, and a paper support 329 is carried by the cross-beam 330 in position to sustain the wrappers as they travel from one set of wringer rollers to the other. The support 329 is provided with fingers 331 which extend into the grooves 328 beneath the wrappers as the wrappers pass between the rollers. The roller 319 is provided with a central peripheral groove 332 into which a finger 333 extends, the finger being supported by a bracket 334 and being provided for the purpose of preventing the wrappers from adhering to the roll 319 when they are discharged therefrom. Stripper fingers 335 extend into the grooves in the roller 318 and direct the wrappers downwardly toward the glue roll 113. The wrappers are supported between the wringer rolls, and the glue roll by rollers 336 and 337 connected by chains 338. The roller 337 is driven by a sprocket chain 339 which passes over a sprocket wheel 340 connected with the roller 318. The wringer rollers 318 and 319 are slightly larger in diameter than the rollers 316 and 317 so that as the saturated paper wrappers are passed between these rollers, the forward portion of the wrapper is caused to travel somewhat faster than the rear portion, and thus the wrapper is stretched longitudinally as it passes between the rollers. At the same time the excess of water in the wrapper is wrung from it and falls into a pan 341 from which it is carried off by a drain 342. The water in the tank 270 overflows at the forward edge of the tank into the pan 341 and is also carried off with the water wrung from the wrappers. It will be noted from Figs. 3 and 6 that the forward edge of the tank 270 is provided with projecting teeth 343 which support the wrappers as they are fed across the edge of the tank and prevent them from being washed downwardly by the overflowing water so that they will be extended between the wringer rollers. The wringer rollers 316 and 319 are provided with an outer covering of rubber which presses against the wrappers as they pass between the rolls, squeezing the water out, and also holding the wrappers against slipping in order to produce the stretching effect previously mentioned.

As shown in Fig. 8, the ends of the wringer rollers 318 and 319 are slightly fluted for the purpose of forming slight corrugations at the edges of the wrappers. This operation produces an additional stretching effect on the wrappers at their edges, thus making the edges slightly longer than the main body. This is done for the reason that the containers 25 have a circumferential rim at their ends, as shown in Fig. 13, and in order for the wrappers to fit properly over these circumferential rims, it is necessary that they be stretched at their edges in the manner described.

The operation of the various parts has been described in connection with the description of the parts and it is thought that it will therefore be unnecessary to review the operation of the mechanism as a whole. It may simply be said that the machine operates automatically to select wrappers, one at a time, from a pile, feed them into a bath of water, preferably hot, where they are soaked to permit expansion of the paper after which the wrappers are stretched and given a coating of adhesive and then wound tightly and smoothly about the packages. The machine is especially suitable for operation on cylindrical pasteboard boxes, such as are now commonly used for packaging rolled oats, and other cereals. The wrappers placed upon the containers while still moist will contract in drying so that they will fit smoothly without wrinkles or other flaws.

I claim:—

1. The method of applying wrappers to packages comprising the steps of moistening the wrappers, stretching said wrappers while in separate sheets by subjecting them to positive mechanical tension, and applying them to the packages subsequent to the stretching operation and while they are still moist.

2. The method of applying wrappers to packages comprising the steps of moistening the wrappers, subjecting them while in separate sheets to a positive mechanical stretching operation, coating the wrappers with adhesive material after they have been stretched, and applying the wrappers to the packages while still moist so that when the wrappers contract in drying they will be evenly stretched about the packages and wrinkles in the wrappers will thus be prevented.

3. The method of applying a wrapper to a package comprising the steps of moistening the wrapper, removing excess of moisture therefrom and simultaneously, stretching the wrapper and thereafter securing the wrapper to the package by means of adhesive material while the wrapper is still moist.

4. The method of applying a wrapper to a package comprising the steps of moistening the wrapper, passing it between rolls to remove excess of moisture therefrom and to exert tension thereon to produce an expansion of said wrapper in the direction of the plane thereof, and subsequently attaching the wrapper to the package by the use of adhesive material.

5. The method of applying a wrapper to a package comprising the steps of moistening the wrapper, passing it between two sets of rolls arranged to feed the wrapper at different rates of speed so that excess of moisture is removed therefrom and a stretching action is imparted to the wrapper, applying a coat of adhesive material to the wrapper, and subsequently winding the wrapper about a package so that it is secured to said package by said adhesive material while the wrapper is still moist.

6. The method of applying a wrapper to a package comprising the steps of moistening the wrapper by subjecting it to the action of a bath of water at approximately the boiling point, stretching the wrapper, and subsequently securing the wrapper to the package by the use of adhesive material while the wrapper is still moist.

7. The method of applying a wrapper to a package comprising the steps of moistening the wrapper by subjecting it to the action of a bath of water at approximately boiling temperature, simultaneously stretching the wrapper, applying adhesive material to one surface of said wrapper and removing excess of moisture therefrom, winding the wrapper about the package with the adhesive coated side in contact with the periphery of the package while the wrapper is still moist, and subsequently permitting the wrapper to dry to cause it to set evenly upon the surface of the package.

8. The method of applying a wrapper to a package comprising the steps of moistening the wrapper, unequally stretching different portions of the wrapper to cause it to fit over an enlarged portion of the package, and subsequently applying the wrapper to the package so that the stretched portion of the wrapper will cover the enlarged portion of the package.

9. The method of applying a wrapper to a package comprising the steps of moistening the wrapper, expanding said wrapper unevenly by stretching it different amounts in different portions thereof, and applying the wrapper to the package so that the portions of said wrapper which have been subjected to the greater stretching action will be applied to enlarged portions of said package.

10. The method of applying a wrapper to a package which has an enlarged portion at the end thereof comprising the steps of moistening said wrapper, stretching said wrapper in a manner to impart a greater expansion of said wrapper at an edge thereof than throughout its body portion, and securing said wrapper by adhesive material to said package while said wrapper is still moist so that the stretched edge thereof will contact with the enlarged end of said package.

11. In combination a rotary carrier, a clamp for holding a package in said carrier, and means for opening said clamp during a portion of the travel thereof to permit a package to be inserted therein and for holding said clamp closed during another portion of the travel thereof to hold said package during the winding of a wrapper thereon, said holding means comprising a spring which operates upon said clamp while said clamp is closed but is free of said clamp while said clamp is open.

12. In combination, a movable carrier, a clamp for holding packages in said carrier, means for opening said clamp at one position of the travel thereof to permit a package to be placed therein, means for holding said clamp closed during a portion of the travel thereof to retain the package in said carrier, said holding means comprising a spring arranged to cooperate continuously with said clamp, and an auxiliary spring intermittently operable on said clamp, and means for rotating said clamp and package while said clamp is closed to cause a wrapper to be wound about said package.

13. In combination, a carrier for cylindrical packages, means for holding packages in said carrier, rollers connected with said carrier and arranged to engage the periphery of said packages to center said packages in position in said carrier, and means for rotating said rollers to exert a rotating force on said packages.

14. In combination, a carrier for cylindrical packages, a clamp for holding the packages in said carrier, rollers arranged to engage the periphery of a package in said clamp to center said package in said carrier, and means for rotating said clamp and said rollers in unison with one another to impart a rotary movement to said package in said carrier to cause a wrapper to be wound thereabout.

15. In combination, a carrier, means for holding a package in said carrier, means for feeding a package to said carrier during the movement thereof, and means connected with said carrier in position thereon for engaging said package independently of the position of said carrier to permit the feeding movement of said package to said carrier for centering said package in position to be engaged by said holding means.

16. In combination, a rotary carrier, clamps for holding packages in said carrier, means for feeding packages to said carrier during the rotation of said carrier, and a centrally arranged roller on said carrier for engaging said packages for different positions of said carrier to center said packages in position to be grasped by said clamps.

17. In combination, a rotary carrier, means for feeding cylindrical packages to said carrier, a clamp for holding said packages in said carrier, rollers journaled in said carrier for engaging the periphery of said packages to center said packages in position to be engaged by said clamp, one of said rollers being coaxial with said carrier to engage said packages for different positions of said carrier, and means for rotating said packages in said carrier to wind a wrapper thereabout.

18. In combination, a rotary carrier, means for continuously rotating said carrier, means for feeding a cylindrical package to said carrier during the rotation thereof, a clamp on said carrier for engaging the ends of said package, rollers journaled on said carrier for engaging the periphery of said package to center said package in said carrier in position to be grasped by said clamp, and means for rotating said clamp and rollers relative to said carrier to impart rotary movement to said package.

19. In a wrapping machine, a pair of coaxial rotary members spaced apart, a rotary clamp carried by one of said members, a rotary clamp carried by the other of said members in axial alinement with said first-mentioned clamp, resilient means for causing said clamps to hold a package between them, and means for rotating said clamps and package about the axis of said clamps, said clamp-rotating means comprising a gear coaxial with said first-mentioned rotary members and operable independently thereof.

20. In a wrapping machine, a carrier-comprising a pair of coaxial rotary members spaced apart, opposing clamps journaled in said members at one side of the axis of said members, resilient means for causing said clamps to hold a package therebetween, means for rotating said clamps relative to said rotary members, said means comprising a gear coaxial with said carrier and a cooperating gear coaxial with said clamps, and means for opening said clamps against the action of said resilient means to permit packages to be placed in position in said clamps and to be discharged therefrom.

21. In a wrapping machine, a carrier comprising a pair of coaxial rotary discs spaced from one another, means for holding a package in position between said discs, and rollers journaled between said discs and bridging the space therebetween for engaging the periphery of said package to position said package between said discs and to assist in pressing a wrapper against the periphery of said package.

22. In a wrapping machine, a carrier comprising a pair of coaxial rotary discs spaced from one another, means for holding a package in position between said discs and for rotating said package relative to said discs to cause a wrapper to be wound thereon, rollers journaled between said discs to engage the periphery of a package held thereby, and driving means for rotating said rollers in unison with said package to assist in securing the wrapper to said package.

23. In combination, a wrapping drum comprising a pair of coaxial rotary discs spaced apart, a clamping member journaled in one of said discs at one side of the axis thereof, a gear connected with said clamping member, a second gear coaxial with said discs and meshing with said first-mentioned gear, and means for rotating said second gear independently of the rotation of said discs and while said discs are rotating for rotating said clamping member relative to said discs.

24. In a wrapping machine, a rotary drum, a clamping member journaled in one end of said drum at one side of the axis of rotation of said drum, a gear on said clamping member, a second gear coaxial with said drum and engaging said first gear to rotate said clamping member, means for operating said gears independently of and simultaneously with the rotation of said drum to cause said clamping member to rotate relative to said drum, a second clamping member journaled in the end of said drum opposite said first clamping member, resilient means for causing said clamping members to hold a package therebetween, rollers journaled in said drum for engaging the periphery of a package held by said clamping members, means for rotating said rollers in unison with the rotation of said clamping members and package held thereby, and a cam for controlling said clamping members during the rotation of said drum to open said clamping members during a portion of the rotation of said drum to permit the discharge of a package from said clamping members and the feeding of another package thereto, said cam being arranged to permit said clamping members to hold a package therebetween during another portion of the rotation of said drum to permit a wrapper to be wound about said package by the rotation thereof.

25. The combination of wrapping mechanism, of a drive therefor, a clutch for connecting said drive with wrapping mechanism, means for moving said clutch out of operative engagement with said drive after said drive has moved said wrapping mechanism a predetermined amount, means for feeding packages to said wrapping mechanism, and a device arranged in the path of movement of said packages for shifting said clutch moving means into inoperative position, and means connected with said clutch for retaining said clutch moving means in inoperative position for a period of time.

26. The combination with wrapping mechanism, of a drive therefor, means for automatically disconnecting said drive from said wrapping mechanism after the completion of an operation, means for feeding packages to said wrapping mechanism, and a device located in the path of movement of said packages for moving said automatic disengaging means out of operative position when said device is engaged by a package, and means separated from said disengaging means for retaining said device out of operative position for a period of time.

27. The combination with a wrapping drum, of a drive for rotating said drum, means for feeding packages, one at a time, to said drum, a clutch for connecting said drive with said drum, means for automatically disconnecting said clutch from said drive after the completion of a wrapping operation, mechanism for controlling said automatic disconnecting means, and a device arranged in the path of travel of the packages fed to said drum for actuating said controlling means.

28. The combination with a rotary drum arranged to receive a package and transfer said package bodily and having mechanism connected therewith for wrapping said package, of an oscillating member pivoted adjacent the periphery of said drum and arranged to deliver a package to said drum while said drum continues to rotate, a chute for supplying packages to said oscillating member, and means operated by said oscillating member for preventing movement of the packages in said chute toward said member during the delivery of a package from said member to said drum.

29. The combination with a rotary drum for holding a package during a wrapping operation having means thereon for rotating said package relative to said drum, of mechanism for coating one surface of a wrapper and for feeding one edge of the coated surface of said wrapper into engagement with said drum, a wiper for engaging said wrapper to hold it against the surface of said package while it is drawn thereabout by the rotation of said package, and means for shifting said wiper during the operation thereof to cause it to follow the contour of said package during said wrapping operation.

30. The combination with a rotary drum having means thereon for holding a package to be wrapped and for rotating said package relative to said drum, of a glue roll for coating one surface of a wrapper and for feeding said wrapper toward said drum to bring the coated edge of said wrapper into engagement with a package carried by said drum, a wiper for pressing said wrapper against the surface of said package as it is drawn thereabout by the rotation of said package, and a cam on said drum for controlling said wiper to cause it to follow the contour of said package.

31. In a wrapping machine, means for drawing a wrapper having adhesive material thereon about a package to be wrapped, and a device having a surface contacting with the adhesive material on said wrapper for supporting a portion of said wrapper not in contact with said package during said wrapping operation.

32. In a wrapping machine, means for rotating a package to be wrapped, means for bringing one edge of the wrapper into engagement with said package so that the rotation of said package will draw the wrapper therewith and cause it to be wound around said package, and a member having a surface arranged to engage the surface of said wrapper to be secured to said package for supporting the portion of the wrapper not yet in engagement with said package.

33. In a wrapping machine, means for coating the surface of a wrapper with adhesive material, means for bringing the coated surface of said wrapper at one edge thereof into engagement with the package to be wrapped, means for rotating said package to draw the wrapper therewith and cause it to be wound around said package, and a plate positioned adjacent said package and having a surface arranged to engage the coated surface of said wrapper to produce a tension on said wrapper as it is drawn from said plate by the rotation of said package.

34. In a wrapping machine, a glue roll for coating a wrapper with adhesive material, means for supporting a package in position to intercept the edge of a wrapper fed from said glue roll, means for rotating said package and moving said package bodily to draw the wrapper away from said roll, and a plate arranged to move with said package for receiving the unattached portion of said wrapper as it is drawn from said roll and for supporting said unattached portion as it is drawn from said plate and wound about said package.

35. In a wrapping machine, a rotary drum, means for supporting a package on said drum and for rotating said package relative thereto, means for coating the surface of a wrapper with adhesive material and for feeding one edge of said wrapper into engagement with said package, and a plate secured to said drum in the rear of said package for receiving the unattached portion of said wrapper when it passes out of engagement with said roll and for guiding said wrapper onto said package.

36. In a wrapping machine, means for moistening wrappers to be placed upon packages, means for exerting tension on separate detached wrappers for stretching the same, and means for applying said wrappers to said packages after said wrappers have been stretched and while they are still moist.

37. In a wrapping machine, means for moistening wrappers to be applied to packages, means for exerting tension on said wrappers for mechanically stretching said wrappers, means for coating the surface of said wrappers with adhesive material after said wrappers have been stretched, and means for applying said wrappers to packages while they are still moist.

38. In a wrapping machine, means for moistening a wrapper, means for removing excess of moisture from said wrapper and for simultaneously, mechanically stretching said wrapper, means for applying adhesive material to said wrapper after excess of moisture has been removed therefrom and after it has been stretched, and means for winding said wrapper about a package while said wrapper is still moist.

39. In a wrapping machine, means for moistening a wrapper, means for applying said wrapper to a package while still moist, and rollers for removing excess of moisture from said wrapper and for stretching said wrapper prior to the application thereof to a package.

40. In a wrapping machine, means for moistening a wrapper, means for applying said wrapper to a package while still moist, and stretching mechanism for said wrapper comprising two feeding devices therefor, one of said devices being arranged to move said wrapper more rapidly than the other so that said wrapper will be stretched when passed simultaneously through both feeding devices.

41. In a wrapping machine, means for moistening a wrapper, means for applying said wrapper to a package while still moist and stretching mechanism for said wrapper comprising two pairs of rollers arranged to engage said wrapper simultaneously, one of said pairs of rollers being arranged to feed said wrapper therethrough at a greater rate of speed than the other of said pair of rollers so that said wrapper will be stretched when passed between said pairs of rollers.

42. In a wrapping machine, means for moistening a wrapper, two pairs of rollers arranged to engage said wrapper simultaneously and to feed said wrapper at different rates of speed so that said wrapper will be stretched when passed between said pairs of rollers, and means for applying said wrapper to a package after it has been stretched and while it is still moist.

43. In a wrapping machine, means for moistening a wrapper, two pairs of rollers for removing excess of moisture from said wrapper, said pairs of rollers being arranged to feed said wrapper therethrough at different rates of speed, means for applying adhesive material to the surface of said wrapper, and means for applying said wrapper to a package after it has been passed between said rollers and while it is moist.

44. In a wrapping machine, means for moistening a wrapper, means for stretching the edges of said wrapper to a greater length than the central portion thereof, and means for applying said wrapper to a package after the edges thereof have been stretched so that the stretched edges thereof shall engage an enlarged portion of said package.

45. In a wrapping machine, means for moistening a wrapper, a pair of rollers through which said wrapper is passed, said rollers having a portion thereof corrugated to stretch said wrapper more at one place than at another, and means for applying said wrapper to a package so that the stretched portion thereof shall engage an enlarged portion of said package.

46. In a wrapping machine, a moistening tank, means for feeding wrappers forwardly in said tank, stretching mechanism for receiving wrappers from said tank and subjecting said wrappers to a stretching operation, and means for applying said wrappers to packages while said wrappers are still moist.

In testimony whereof I have signed my name to this specification on this 2d day of October, A. D. 1918.

AXEL R. SCHOLIN.